US011838121B2

(12) United States Patent
Kutz et al.

(10) Patent No.: US 11,838,121 B2
(45) Date of Patent: Dec. 5, 2023

(54) DOWNLINK TRANSMISSION REQUIREMENT BASED ON DOWNLINK COMPENSATION CAPABILITY OF A USER EQUIPMENT

(71) Applicant: QUALCOMM Incorporated, San Diego, CA (US)

(72) Inventors: Gideon Shlomo Kutz, Ramat Hasharon (IL); Assaf Touboul, Netanya (IL); Sharon Levy, Binyamina (IL); Ory Eger, Tel Aviv (IL); Shay Landis, Hod Hasharon (IL); Michael Levitsky, Rehovot (IL); Guy Wolf, Rosh Haayin (IL)

(73) Assignee: QUALCOMM Incorporated, San Diego, CA (US)

(*) Notice: Subject to any disclaimer, the term of this patent is extended or adjusted under 35 U.S.C. 154(b) by 134 days.

(21) Appl. No.: 17/365,379

(22) Filed: Jul. 1, 2021

(65) Prior Publication Data
US 2023/0006765 A1 Jan. 5, 2023

(51) Int. Cl.
H04W 72/51 (2023.01)
H04L 1/00 (2006.01)

(52) U.S. Cl.
CPC .......... H04L 1/0033 (2013.01); H04W 72/51 (2023.01)

(58) Field of Classification Search
None
See application file for complete search history.

(56) References Cited

U.S. PATENT DOCUMENTS

| 8,879,468 B2 | 11/2014 | Benjebbour et al. |
| 2004/0136395 A1* | 7/2004 | Itahara ................ H04L 27/2614 370/441 |
| 2016/0006521 A1 | 1/2016 | Yoshimoto et al. |
| 2016/0218891 A1* | 7/2016 | Nammi ............. H04L 25/03828 |
| 2018/0077603 A1* | 3/2018 | John Wilson ....... H04L 27/0014 |
| 2018/0091350 A1* | 3/2018 | Akkarakaran .... H04L 27/26134 |
| 2018/0294907 A1 | 10/2018 | Chen et al. |
| 2018/0323933 A1* | 11/2018 | Nam ..................... H04L 5/0051 |
| 2018/0324005 A1* | 11/2018 | Kim ..................... H04L 5/0007 |
| 2019/0223229 A1* | 7/2019 | Sharma .................. H04W 8/22 |

(Continued)

FOREIGN PATENT DOCUMENTS

WO WO-2022073615 A1 * 4/2022

OTHER PUBLICATIONS

International Search Report and Written Opinion—PCT/US2022/072687—ISA/EPO—dated Sep. 19, 2022.

(Continued)

Primary Examiner — Nicholas Sloms
(74) Attorney, Agent, or Firm — Muncy, Geissler, Olds & Lowe, P.C.

(57) ABSTRACT

Disclosed are techniques for wireless communication. In an aspect, a base station receives one or more signals indicative of a downlink compensation capability (e.g., an in-band capability to compensate for non-linear distortion, or an out-of-band capability to compensate for other FDM'd signal(s) to other UE(s), etc.) of at least one UE. The base station determines a set of downlink transmission requirements based on the downlink compensation capability of the at least one UE, and transmits data to the at least one UE in accordance with the set of downlink transmission requirements.

26 Claims, 13 Drawing Sheets

(56) References Cited

U.S. PATENT DOCUMENTS

| | | | | |
|---|---|---|---|---|
| 2019/0274117 A1* | 9/2019 | Zhang | ................... | H04W 74/00 |
| 2020/0068570 A1* | 2/2020 | Khan | ................... | H04B 1/0475 |
| 2020/0229076 A1* | 7/2020 | Jin | ....................... | H04W 8/245 |
| 2021/0185513 A1* | 6/2021 | Liu | ....................... | H04W 76/10 |
| 2021/0320694 A1* | 10/2021 | Zhong | ................ | H04L 25/0226 |
| 2022/0330039 A1* | 10/2022 | Wang | .................... | H04W 8/22 |

OTHER PUBLICATIONS

Frenger P., et al., "More Capacity and Less Power: How 5G NR can Reduce Network Energy Consumption", 5 Pages, 2019 IEEE 89th Vehicular Technology Conference (VTC2019-Spring), Date of Conference: Apr. 28-May 1, 2019, 5 Pages.

Humar I., et al., "Rethinking Energy Efficiency Models of Cellular Networks with Embodied Energy", IEEE Network, Mar.-Apr. 2011, vol. 25, No. 2, pp. 40-49.

Pedram M., et al., "Energy Efficiency in 5G Cellular Network Systems", IEEE Design & Test, Dec. 17, 2019, pp. 64-78.

\* cited by examiner

DOWNLINK TRANSMISSION REQUIREMENT BASED ON DOWNLINK COMPENSATION CAPABILITY OF A USER EQUIPMENT

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In recent years, there has been a growing concern over the power consumed by cellular networks (e.g., by RAN components such as gNB and/or core network components) due to environmental factors such as carbon emissions. In addition, the power consumption of cellular networks may very expensive as well. As a result, network energy efficiency is an important design criterion for cellular network deployments.

Power consumption of base stations (or gNBs) is a particular contributor to cellular network power consumption. A high power consumption component of such base stations is the power amplifier (PA), which generally accepts an input signal at a certain input power, applies a gain to the input signal to produce a power-amplified version of the input signal, and then transmits the power-amplified signal via transmit antenna(s). As cellular networks adopt higher carrier frequencies, the power consumption of the PA components is expected to increase (e.g., both because of more antenna elements and proportionally poorer PA efficiency at those higher frequencies).

Downlink transmission requirements (e.g., as error vector magnitude (EVM) requirement, adjacent carrier leakage ratio (ACLR) requirement and/or mask requirement) place constraint(s) on the gNB PAs input power (e.g., minimal backoff) and, as a result, on the power efficiency of the gNB PAs.

In current cellular network deployments, the various downlink transmission requirements (e.g., EVM, ACLR and/or mask requirements) are pre-defined (or fixed) irrespective of factors such as network conditions, UE capability (e.g., low-tier vs. premium UE), vendor-specific frequencies, and so on. Hence, such pre-defined downlink transmission requirements generally are set to relatively conservative levels so as to facilitate good performance despite these operational disparities.

Aspects of the disclosure are directed to downlink transmission requirement(s) that are determined based at least in part on a downlink compensation capability of UE(s). Such aspects may provide various technical advantages, such as a more flexible (or dynamic) allocation of downlink transmission requirement(s) (e.g., EVM, ACLR and/or mask requirements) which may facilitate a reduction to overall network power consumption (e.g., in some cases this may involve an increase in instantaneous transmission power, although the net or aggregate amount of power used to transmit a given amount of data is lowered, e.g., with a higher data rate transmission).

In an aspect, a method of operating a base station includes receiving one or more signals indicative of a downlink compensation capability of at least one user equipment (UE); determining a set of downlink transmission requirements based on the downlink compensation capability of the at least one UE; and transmitting data to the at least one UE in accordance with the set of downlink transmission requirements.

In some aspects, the at least one UE comprises an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the one or more signals comprise a capability indication from the in-band UE.

In some aspects, the one or more signals comprise UE feedback associated with one or more compressed or non-linearly distorted downlink reference signals.

In some aspects, the one or more compressed and non-linearly distorted downlink reference signals correspond to one or more channel state information (CSI) reference signals.

In some aspects, the one or more compressed and non-linearly distorted signals comprise a plurality of compressed and non-linearly distorted signals that are associated with different degrees of compression.

In some aspects, the non-linear compensation capability of the in-band UE corresponds to a highest degree of compression from the different degrees of compression that the in-band UE is capable of tolerating.

In some aspects, the set of downlink transmission requirements defines at least one constraint associated with input power to a power amplifier (PA), PA gain, or both, at the base station, and the at least one constraint sets a different amount of input power to the PA, a higher PA gain, or both, relative to a default set of downlink transmission requirements.

In some aspects, the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

In some aspects, the signal quality feedback comprises a signal-to-noise ratio (SNR) measurement or a reference signal received quality (RSRQ) measurement.

In some aspects, the set of downlink transmission requirements comprises an adjacent carrier leakage ratio (ACLR) requirement, a mask requirement, or a combination thereof.

In some aspects, the set of downlink transmission requirements is set to a default set of downlink transmission requirements if the OOB compensation capability of the respective UE is below a threshold, and the set of downlink transmission requirements is set to a dynamic set of downlink transmission requirements different than the default set of downlink requirements if the OOB compensation capability of the respective UE is not below the threshold.

In some aspects, the set of downlink transmission requirements defines at least one constraint associated with input power to a power amplifier (PA), PA gain, or both, at the base station, and the at least one constraint sets a different a different amount of input power to the PA a higher PA gain, or both, relative to the default set of downlink transmission requirements.

In some aspects, the set of downlink transmission requirements is set to a default set of downlink transmission requirements irrespective of the OOB compensation capability of the respective UE if the respective UE is operating at a frequency range within a threshold to an edge of an in-band frequency range.

In some aspects, the set of downlink transmission requirements is further based on one or more inter-cell interference parameters.

In an aspect, a method of operating a user equipment (UE) includes transmitting, to a base station, a capability indication of a downlink compensation capability of the UE; and
receiving, from the base station, data in accordance with a set of downlink transmission requirements that is based at least in part upon the capability indication.

In some aspects, the UE is an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the set of downlink transmission requirements sets at least one constraint associated with input power to a power amplifier (PA), PA gain, or both, at the base station, and the at least one constraint sets a different amount of input power to the PA a higher PA gain, or both, relative to a default set of downlink transmission requirements.

In an aspect, a base station includes a memory; at least one transceiver; and at least one processor communicatively coupled to the memory and the at least one transceiver, the at least one processor configured to: receive, via the at least one transceiver, one or more signals indicative of a downlink compensation capability of at least one user equipment (UE); determine a set of downlink transmission requirements based on the downlink compensation capability of the at least one UE; and transmit, via the at least one transceiver, data to the at least one UE in accordance with the set of downlink transmission requirements.

In some aspects, the at least one UE comprises an in-band UE in communication with the base station over an in-band frequency range, and the downlink compensation capability comprises a non-linear compensation capability of the in-band UE.

In some aspects, the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

In some aspects, the signal quality feedback comprises a signal-to-noise ratio (SNR) measurement or a reference signal received quality (RSRQ) measurement.

In some aspects, the set of downlink transmission requirements comprises an adjacent carrier leakage ratio (ACLR) requirement, a mask requirement, or a combination thereof.

In some aspects, the set of downlink transmission requirements is set to a default set of downlink transmission requirements if the OOB compensation capability of the respective UE is below a threshold, and the set of downlink transmission requirements is set to a dynamic set of downlink transmission requirements different than the default set of downlink requirements if the OOB compensation capability of the respective UE is not below the threshold.

In some aspects, the set of downlink transmission requirements defines at least one constraint associated with input power to a power amplifier (PA), PA gain, or both, at the base station, and the at least one constraint sets a different a different amount of input power to the PA a higher PA gain, or both, relative to the default set of downlink transmission requirements.

In some aspects, the set of downlink transmission requirements is set to a default set of downlink transmission requirements irrespective of the OOB compensation capability of the respective UE if the respective UE is operating at a frequency range within a threshold to an edge of an in-band frequency range.

In some aspects, the set of downlink transmission requirements is further based on one or more inter-cell interference parameters.

In an aspect, The base station of claim 22, wherein the set of downlink transmission requirements comprises an error vector magnitude (EVM) requirement.

In an aspect, The base station of claim 22, wherein the one or more signals comprise a capability indication from the in-band UE.

In an aspect, The base station of claim 22, wherein the one or more signals comprise UE feedback associated with one or more compressed or non-linearly distorted downlink reference signals.

In some aspects, the one or more compressed and non-linearly distorted downlink reference signals correspond to one or more channel state information (CSI) reference signals.

In some aspects, the one or more compressed and non-linearly distorted signals comprise a plurality of compressed and non-linearly distorted signals that are associated with different degrees of compression.

In some aspects, the non-linear compensation capability of the in-band UE corresponds to a highest degree of compression from the different degrees of compression that the in-band UE is capable of tolerating.

In an aspect, The base station of claim 22, wherein the set of downlink transmission requirements defines at least one constraint associated with input power to a power amplifier (PA), PA gain, or both, at the base station, and wherein the at least one constraint sets a different amount of input power to the PA, a higher PA gain, or both, relative to a default set of downlink transmission requirements.

In an aspect, a user equipment (UE) includes a memory; at least one transceiver; and at least one processor communicatively coupled to the memory and the at least one transceiver, the at least one processor configured to: transmit, via the at least one transceiver, to a base station, a capability indication of a downlink compensation capability of the UE; and receive, via the at least one transceiver, from the base station, data in accordance with a set of downlink transmission requirements that is based at least in part upon the capability indication.

In some aspects, the UE is an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the set of downlink transmission requirements sets at least one constraint associated with input power to a power amplifier (PA), PA gain, or both, at the base station, and the at least one constraint sets a different amount of input power to the PA a higher PA gain, or both, relative to a default set of downlink transmission requirements.

In an aspect, a base station includes means for receiving one or more signals indicative of a downlink compensation capability of at least one user equipment (UE); means for determining a set of downlink transmission requirements based on the downlink compensation capability of the at least one UE; and means for transmitting data to the at least one UE in accordance with the set of downlink transmission requirements.

In some aspects, the at least one UE comprises an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the one or more signals comprise a capability indication from the in-band UE.

In some aspects, the one or more signals comprise UE feedback associated with one or more compressed or non-linearly distorted downlink reference signals.

In some aspects, the one or more compressed and non-linearly distorted downlink reference signals correspond to one or more channel state information (CSI) reference signals.

In some aspects, the one or more compressed and non-linearly distorted signals comprise a plurality of compressed and non-linearly distorted signals that are associated with different degrees of compression.

In some aspects, the non-linear compensation capability of the in-band UE corresponds to a highest degree of compression from the different degrees of compression that the in-band UE is capable of tolerating.

In some aspects, the set of downlink transmission requirements defines at least one constraint associated with input power to a power amplifier (PA), PA gain, or both, at the base station, and the at least one constraint sets a different amount of input power to the PA, a higher PA gain, or both, relative to a default set of downlink transmission requirements.

In some aspects, the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

In some aspects, the signal quality feedback comprises a signal-to-noise ratio (SNR) measurement or a reference signal received quality (RSRQ) measurement.

In some aspects, the set of downlink transmission requirements comprises an adjacent carrier leakage ratio (ACLR) requirement, a mask requirement, or a combination thereof.

In some aspects, the set of downlink transmission requirements is set to a default set of downlink transmission requirements if the OOB compensation capability of the respective UE is below a threshold, and the set of downlink transmission requirements is set to a dynamic set of downlink transmission requirements different than the default set of downlink requirements if the OOB compensation capability of the respective UE is not below the threshold.

In some aspects, the set of downlink transmission requirements defines at least one constraint associated with input power to a power amplifier (PA), PA gain, or both, at the base station, and the at least one constraint sets a different a different amount of input power to the PA a higher PA gain, or both, relative to the default set of downlink transmission requirements.

In some aspects, the set of downlink transmission requirements is set to a default set of downlink transmission requirements irrespective of the OOB compensation capability of the respective UE if the respective UE is operating at a frequency range within a threshold to an edge of an in-band frequency range.

In some aspects, the set of downlink transmission requirements is further based on one or more inter-cell interference parameters.

In an aspect, a user equipment (UE) includes means for transmitting, to a base station, a capability indication of a downlink compensation capability of the UE; and means for receiving, from the base station, data in accordance with a set of downlink transmission requirements that is based at least in part upon the capability indication.

In some aspects, the UE is an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the set of downlink transmission requirements sets at least one constraint associated with input power to a power amplifier (PA), PA gain, or both, at the base station, and the at least one constraint sets a different amount of input power to the PA a higher PA gain, or both, relative to a default set of downlink transmission requirements.

In an aspect, a non-transitory computer-readable medium storing computer-executable instructions that, when executed by a base station, cause the base station to: receive one or more signals indicative of a downlink compensation capability of at least one user equipment (UE); determine a set of downlink transmission requirements based on the downlink compensation capability of the at least one UE; and transmit data to the at least one UE in accordance with the set of downlink transmission requirements.

In some aspects, the at least one UE comprises an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the one or more signals comprise a capability indication from the in-band UE.

In some aspects, the one or more signals comprise UE feedback associated with one or more compressed or non-linearly distorted downlink reference signals.

In some aspects, the one or more compressed and non-linearly distorted downlink reference signals correspond to one or more channel state information (CSI) reference signals.

In some aspects, the one or more compressed and non-linearly distorted signals comprise a plurality of compressed and non-linearly distorted signals that are associated with different degrees of compression.

In some aspects, the non-linear compensation capability of the in-band UE corresponds to a highest degree of compression from the different degrees of compression that the in-band UE is capable of tolerating.

In some aspects, the set of downlink transmission requirements defines at least one constraint associated with input power to a power amplifier (PA), PA gain, or both, at the base station, and the at least one constraint sets a different amount of input power to the PA, a higher PA gain, or both, relative to a default set of downlink transmission requirements.

In some aspects, the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

In some aspects, the signal quality feedback comprises a signal-to-noise ratio (SNR) measurement or a reference signal received quality (RSRQ) measurement.

In some aspects, the set of downlink transmission requirements comprises an adjacent carrier leakage ratio (ACLR) requirement, a mask requirement, or a combination thereof.

In some aspects, the set of downlink transmission requirements is set to a default set of downlink transmission requirements if the OOB compensation capability of the respective UE is below a threshold, and the set of downlink transmission requirements is set to a dynamic set of downlink transmission requirements different than the default set of downlink requirements if the OOB compensation capability of the respective UE is not below the threshold.

In some aspects, the set of downlink transmission requirements defines at least one constraint associated with input power to a power amplifier (PA), PA gain, or both, at the base station, and the at least one constraint sets a different a different amount of input power to the PA a higher PA gain, or both, relative to the default set of downlink transmission requirements.

In some aspects, the set of downlink transmission requirements is set to a default set of downlink transmission requirements irrespective of the OOB compensation capability of the respective UE if the respective UE is operating at a frequency range within a threshold to an edge of an in-band frequency range.

In some aspects, the set of downlink transmission requirements is further based on one or more inter-cell interference parameters.

In an aspect, a non-transitory computer-readable medium storing computer-executable instructions that, when executed by a user equipment (UE), cause the UE to: transmit, to a base station, a capability indication of a downlink compensation capability of the UE; and receive, from the base station, data in accordance with a set of downlink transmission requirements that is based at least in part upon the capability indication.

In some aspects, the UE is an in-band UE in communication with the base station over an in-band frequency range, and the downlink compensation capability comprises a non-linear compensation capability of the in-band UE.

In some aspects, the set of downlink transmission requirements comprises an error vector magnitude (EVM) requirement.

In some aspects, the set of downlink transmission requirements sets at least one constraint associated with input power to a power amplifier (PA), PA gain, or both, at the base station, and the at least one constraint sets a different amount of input power to the PA a higher PA gain, or both, relative to a default set of downlink transmission requirements.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
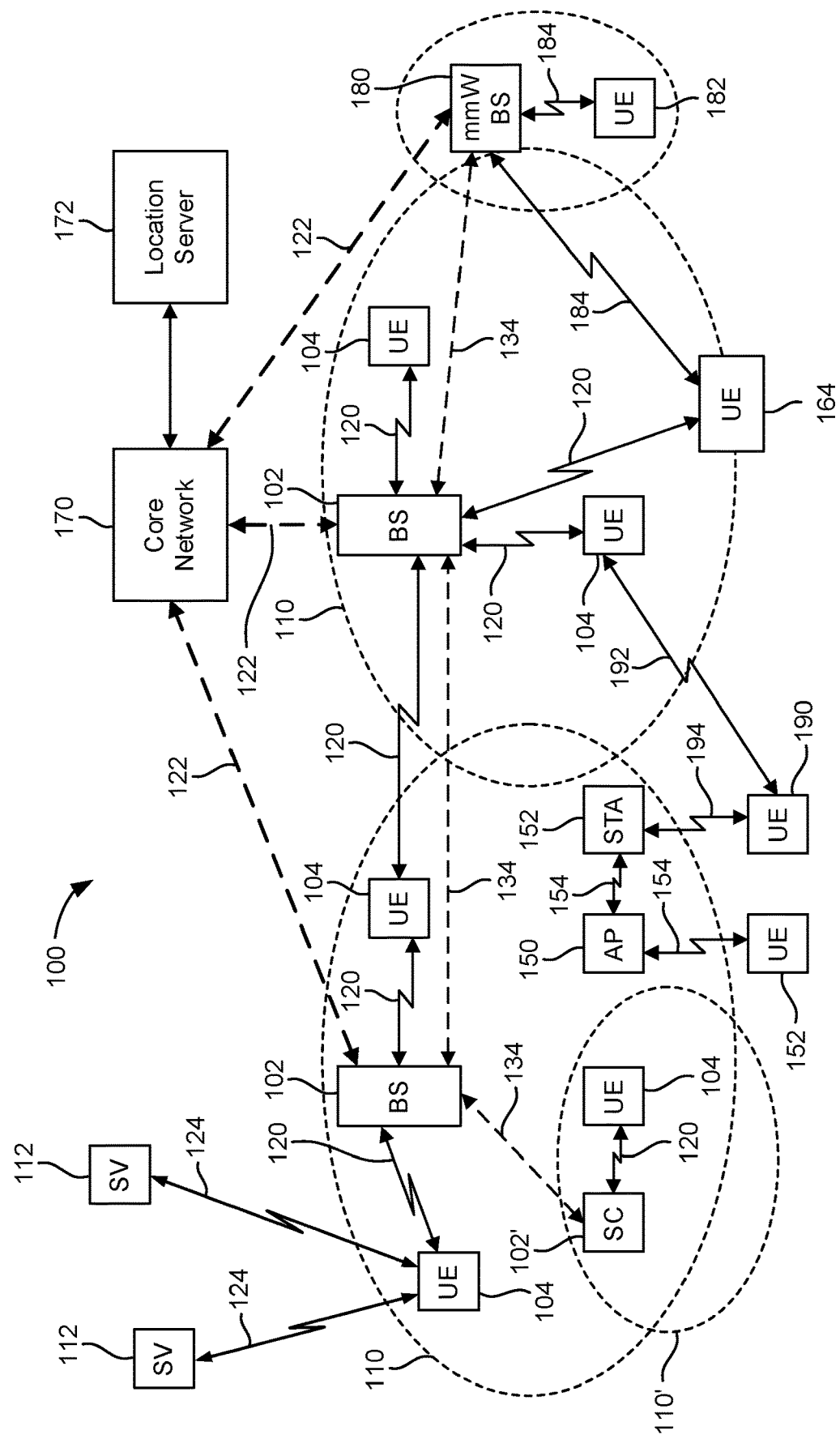
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
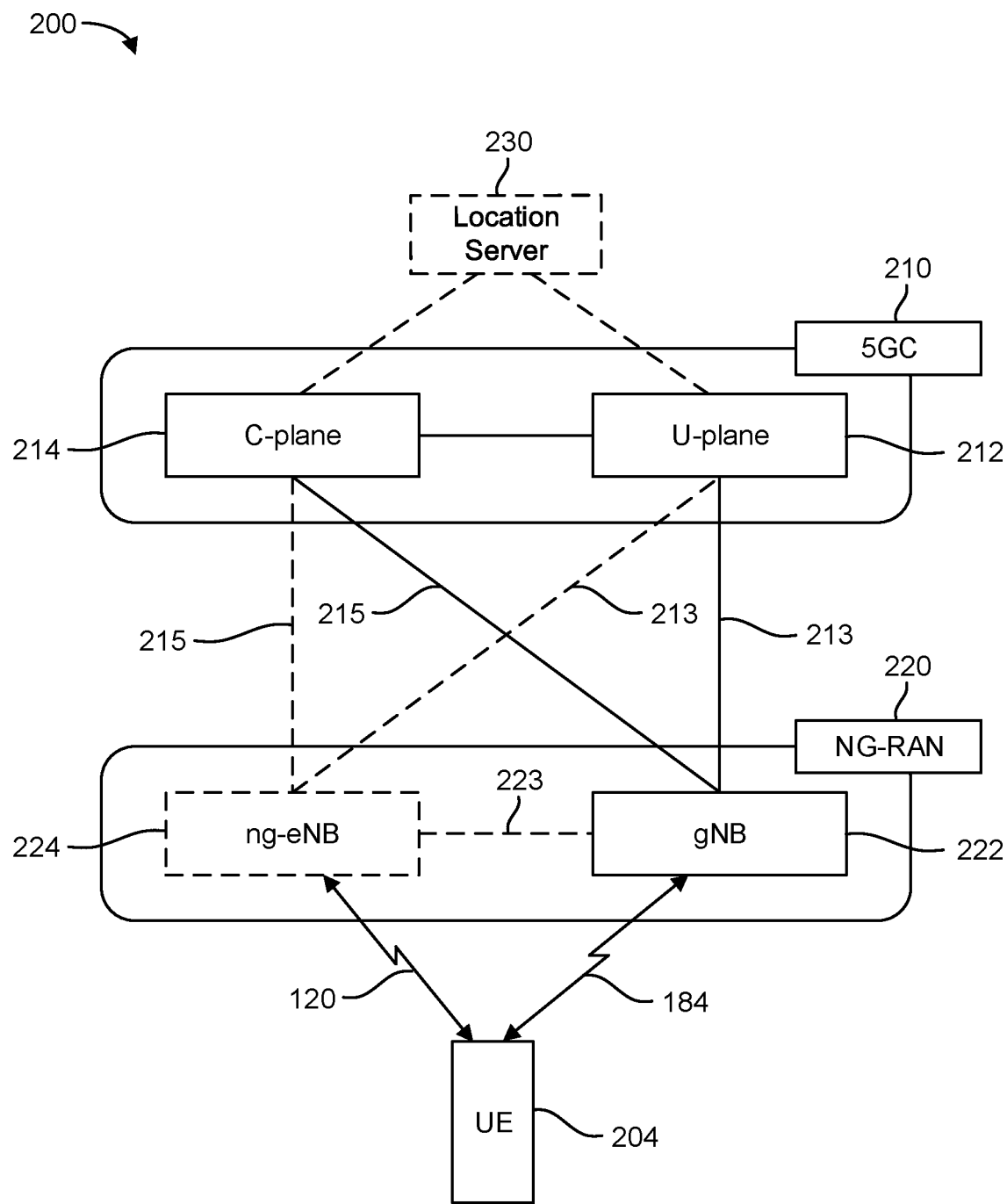
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
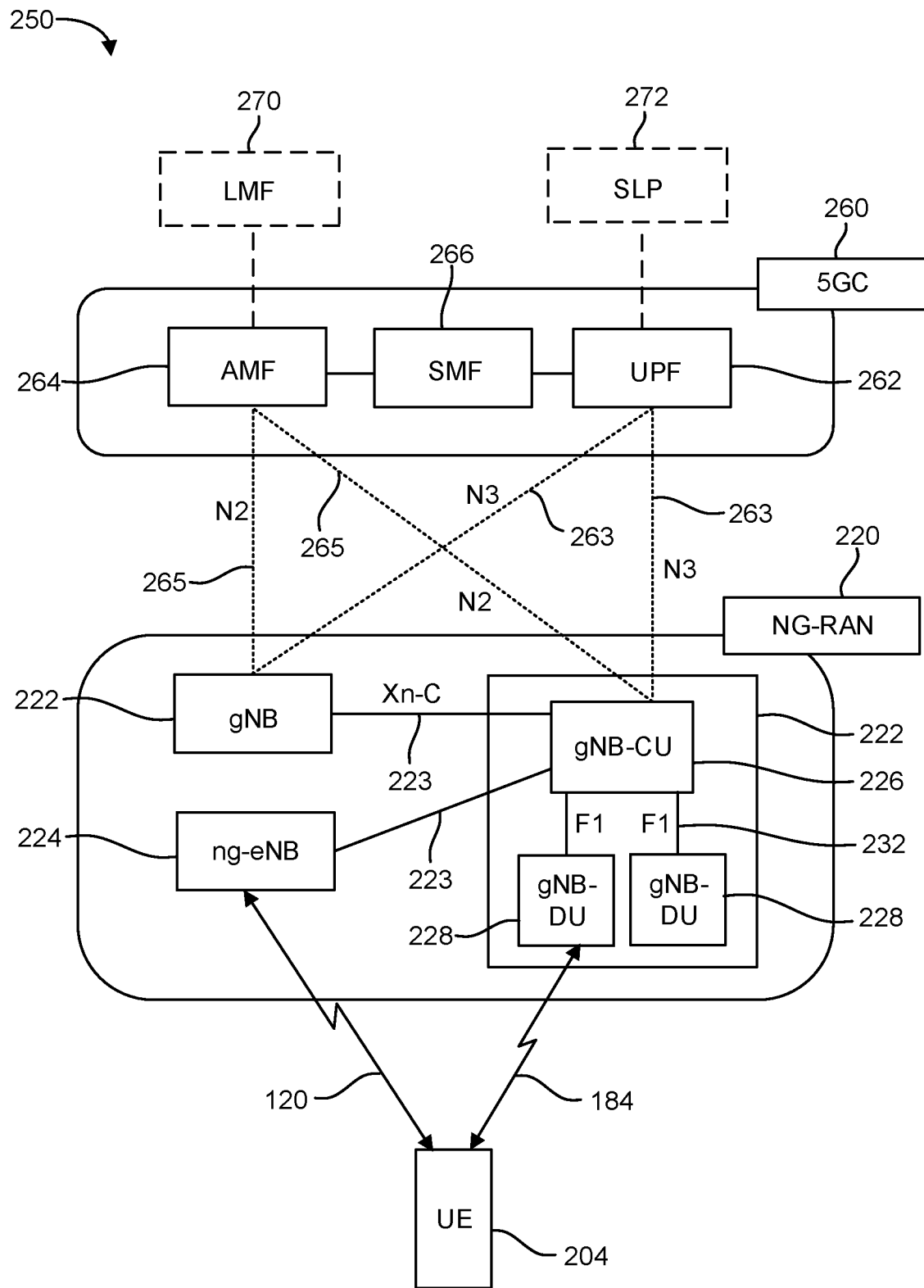

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
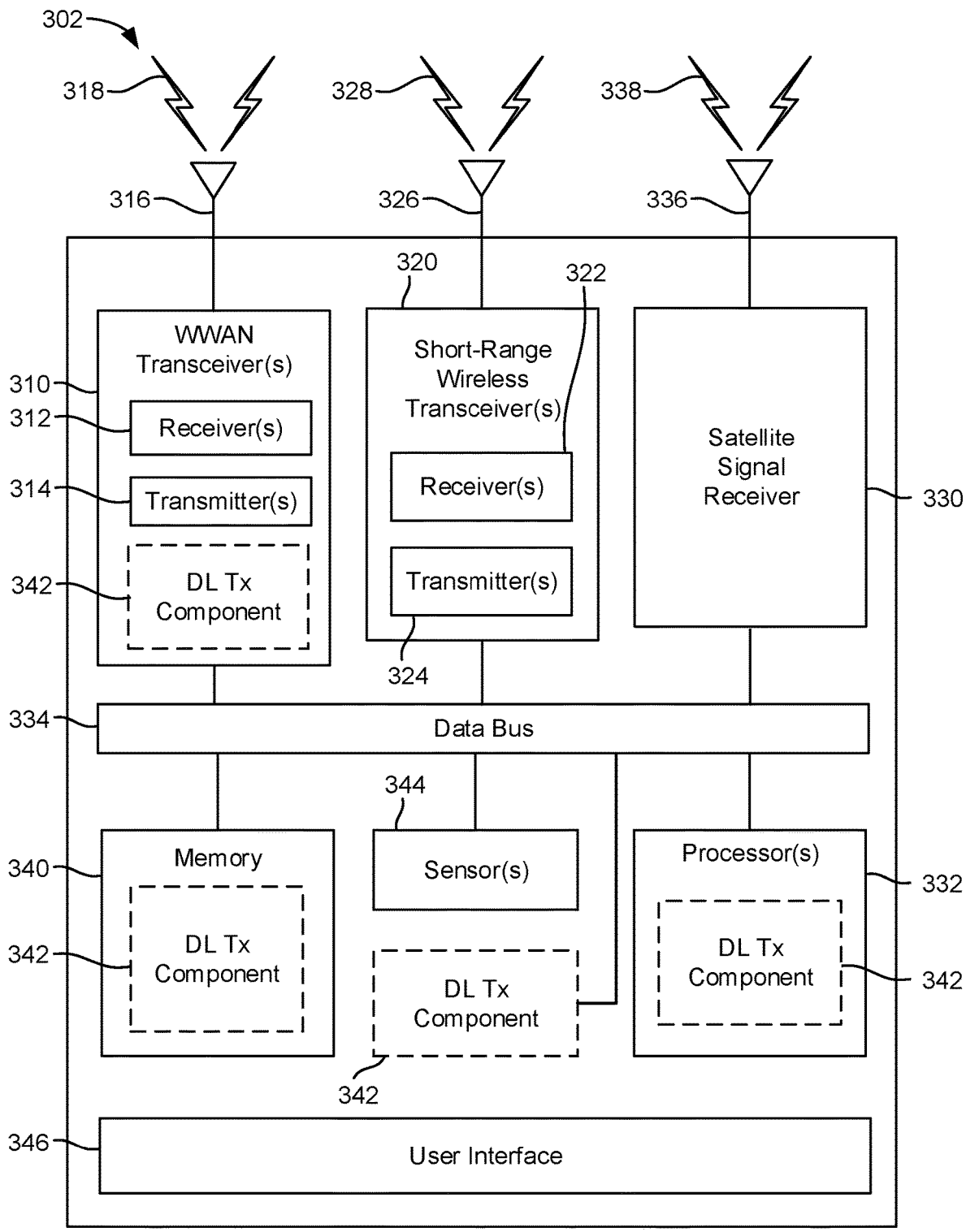
FIGS. 3A, 3B, and 3C are simplified block diagrams of several sample aspects of components that may be employed in a user equipment (UE), a base station, and a network entity, respectively, and configured to support communications as taught herein.
Figure 3B:
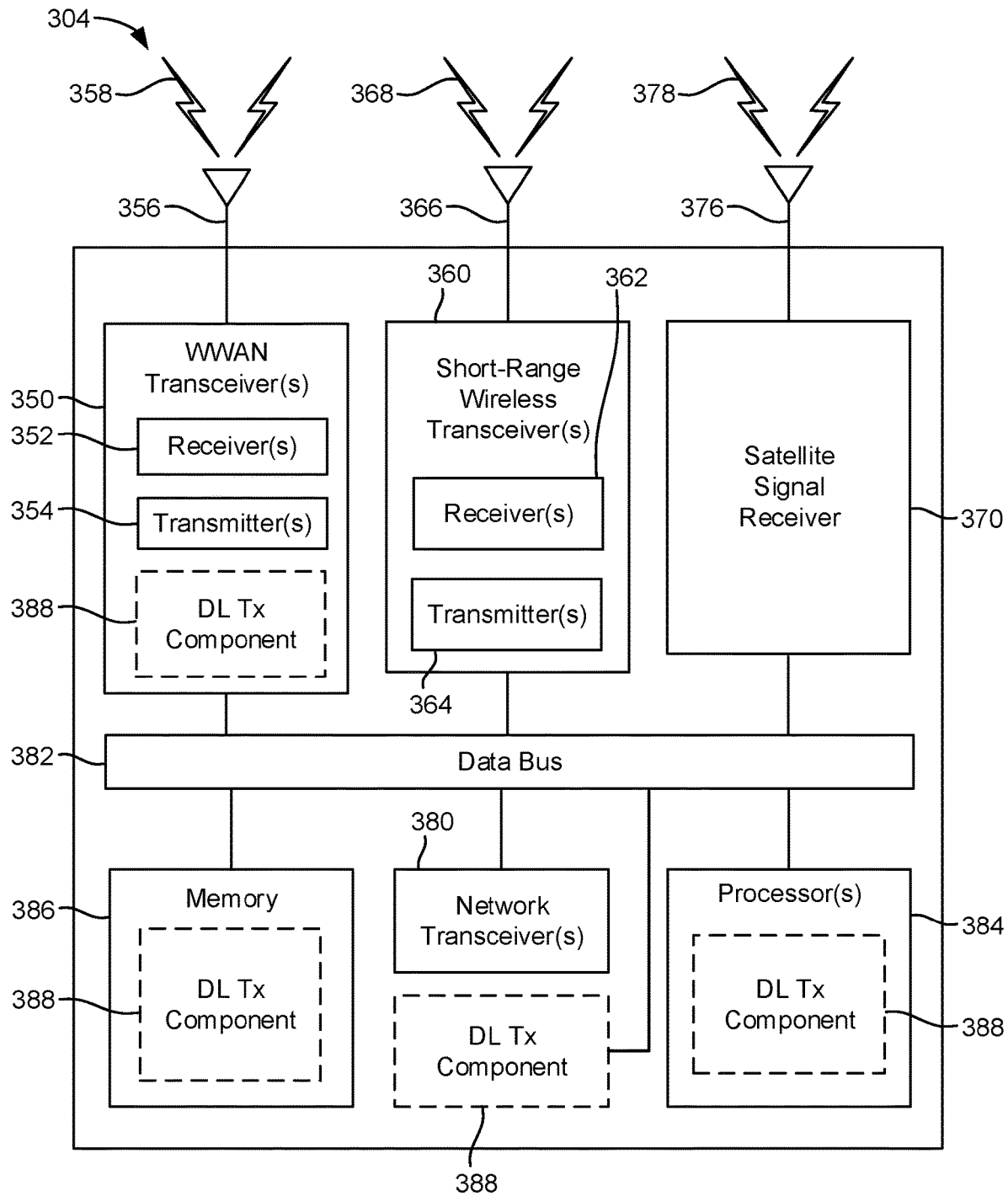
Figure 3C:
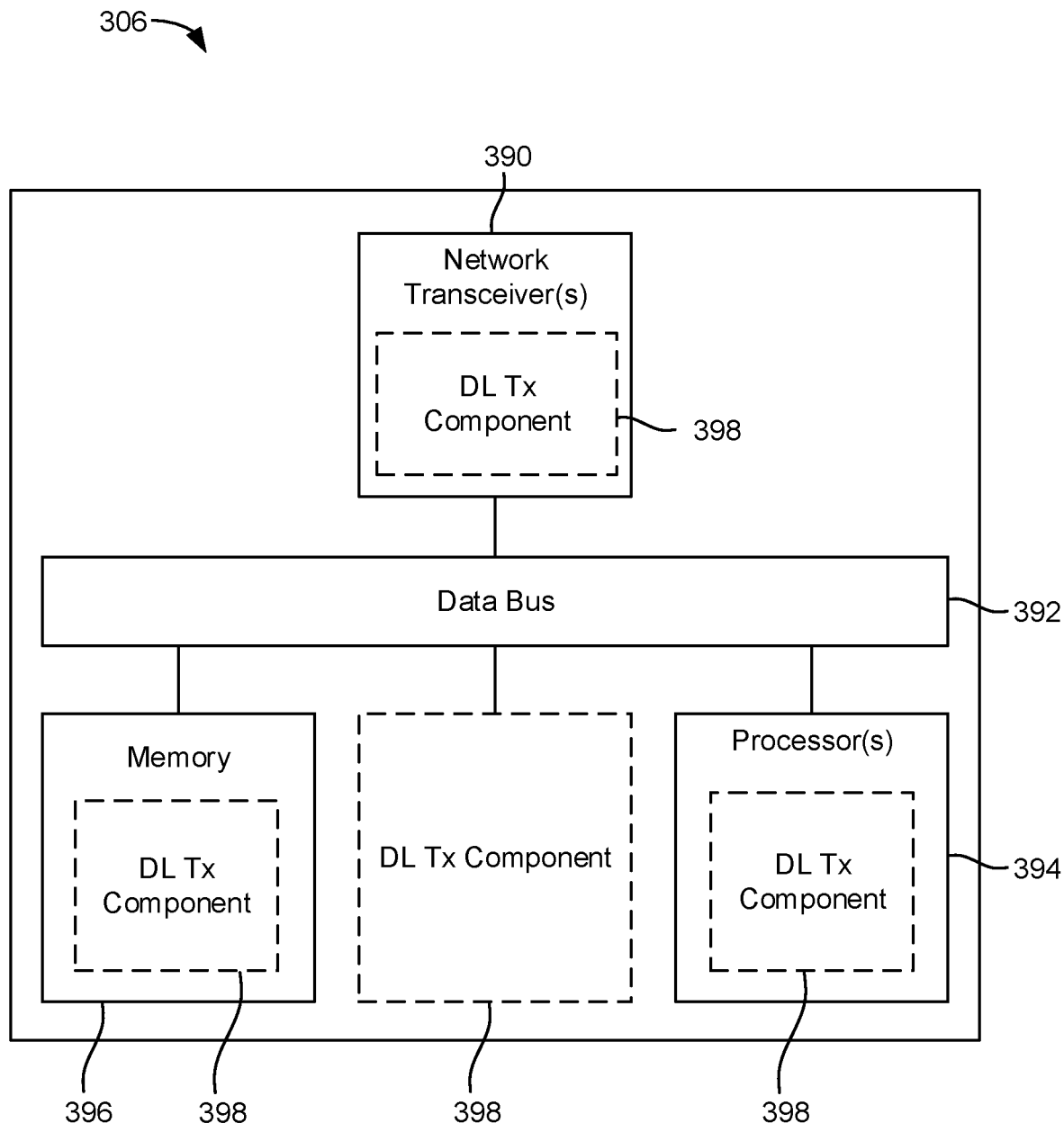

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include downlink transmission component 342, 388, and 398, respectively. The downlink transmission component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the downlink transmission component 342, 388, and 398 may be external to the processors 332, 384, and 394 (e.g., part of a modem processing system, integrated with another processing system, etc.). Alternatively, the downlink transmission component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the downlink transmission component 342, which may be, for example, part of the one or more WWAN transceivers 310, the memory 340, the one or more processors 332, or any combination thereof, or may be a standalone component. FIG. 3B illustrates possible locations of the downlink transmission component 388, which may be, for example, part of the one or more WWAN transceivers 350, the memory 386, the one or more processors 384, or any combination thereof, or may be a standalone component. FIG. 3C illustrates possible locations of the downlink transmission component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the downlink transmission component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Note that the UE 302 illustrated in FIG. 3A may represent a "low-tier" UE or a "premium" UE. As described further below, while low-tier and premium UEs may have the same types of components (e.g., both may have WWAN transceivers 310, processing systems 332, memory components 340, etc.), the components may have different degrees of functionality (e.g., increased or decreased performance, more or fewer capabilities, etc.) depending on whether the UE 302 corresponds to a low-tier UE or a premium UE.

Figure 4:
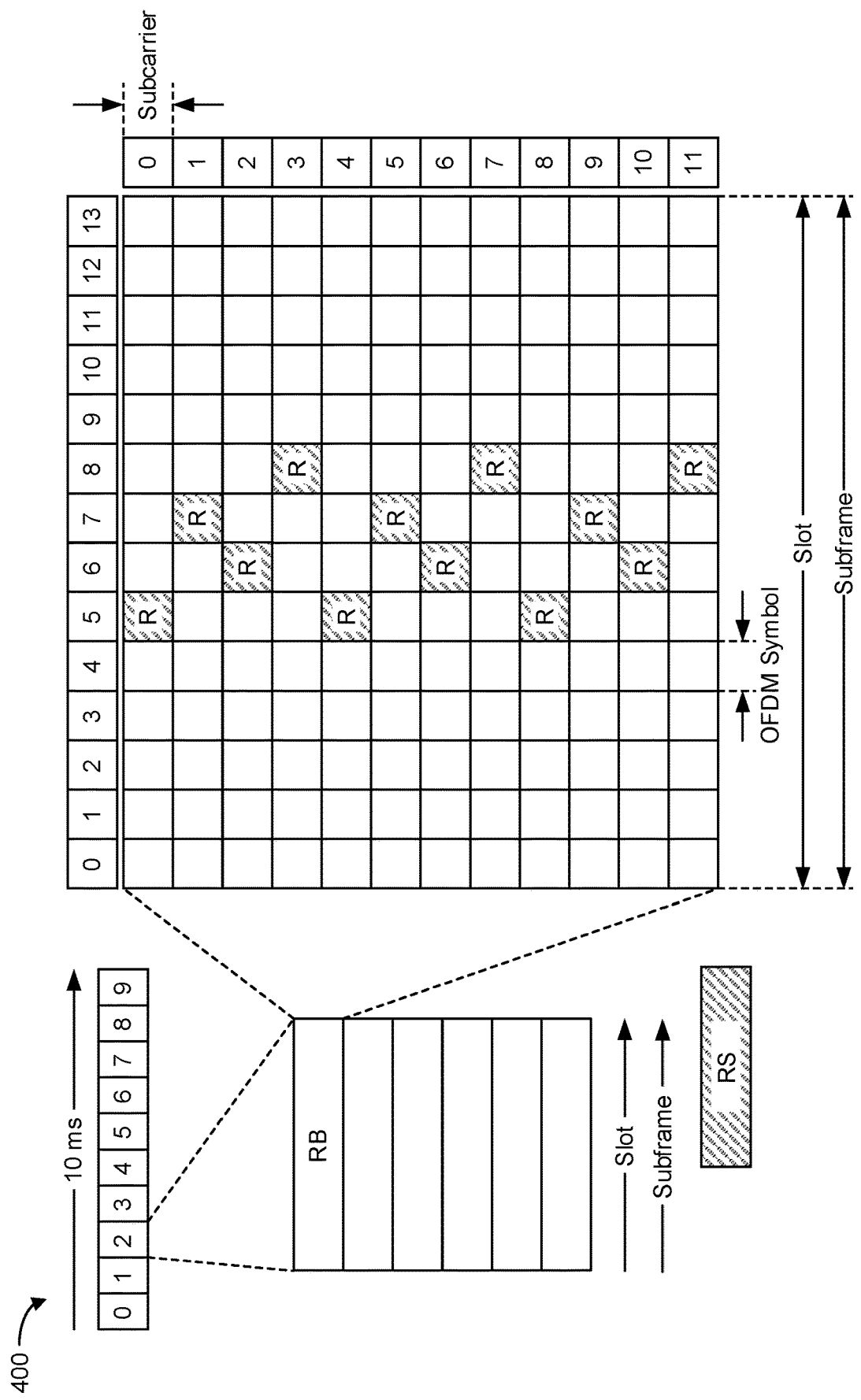
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
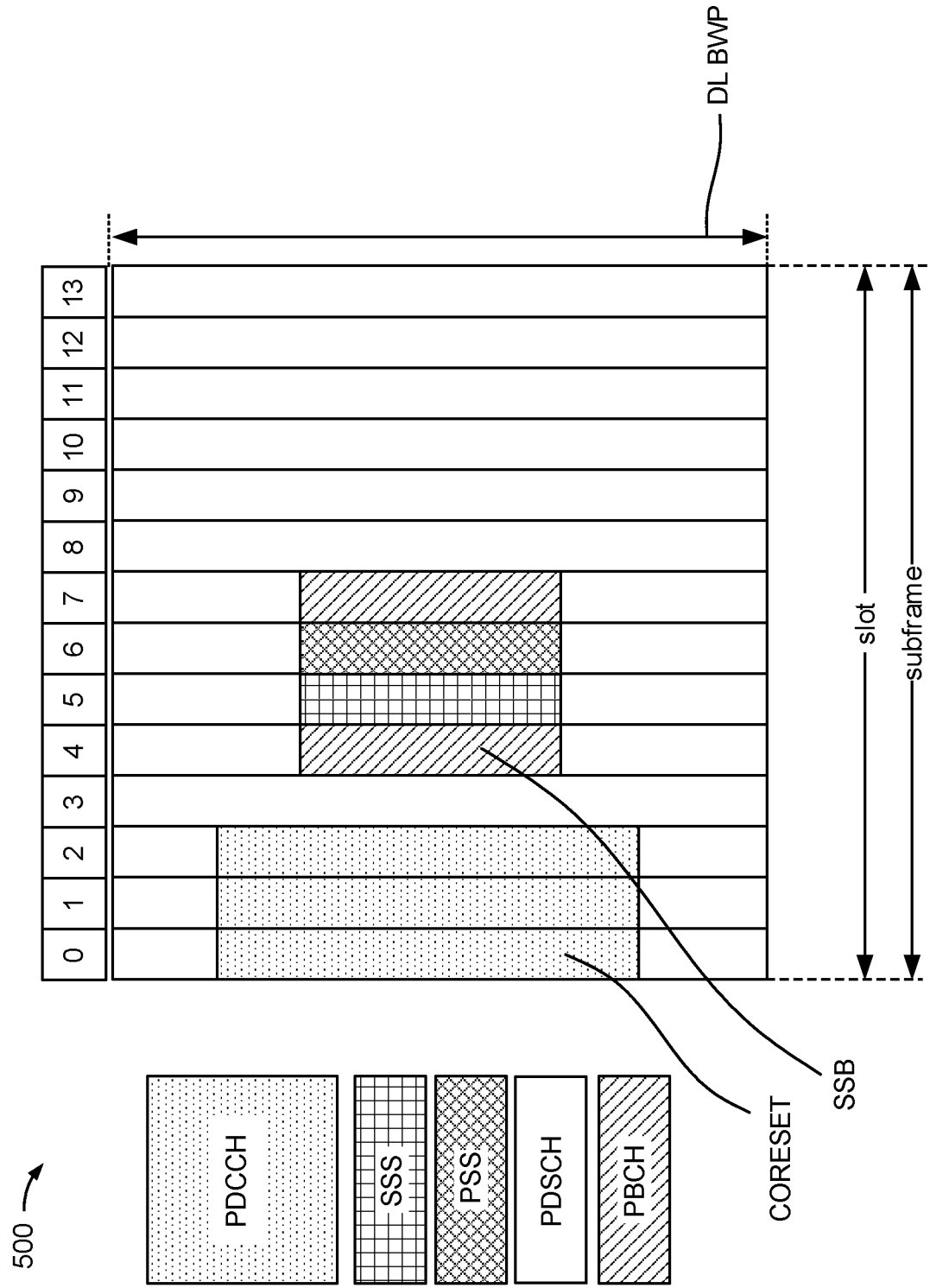
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORE-SET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

UEs may be classified as low-tier UEs (e.g., wearables, such as smart watches, glasses, rings, etc.) and premium UEs (e.g., smartphones, tablet computers, laptop computers, etc.). Low-tier UEs may alternatively be referred to as reduced-capability NR UEs, reduced-capability UEs, NR light UEs, light UEs, NR super light UEs, or super light UEs. Premium UEs may alternatively be referred to as full-capability UEs or simply UEs. Low-tier UEs generally have lower baseband processing capability, fewer antennas (e.g., one receiver antenna as baseline in FR1 or FR2, two receiver antennas optionally), lower operational bandwidth capabilities (e.g., 20 MHz for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "low-tier" and other types of UEs may be assigned a classification of "premium." Certain tiers of UEs may also report their type (e.g., "low-tier" or "premium") to the network. Additionally, certain resources and/or channels may be dedicated to certain types of UEs.

As will be appreciated, the accuracy of low-tier UE positioning may be limited. For example, a low-tier UE may operate on a reduced bandwidth, such as 5 to 20 MHz for wearable devices and "relaxed" IoT devices (i.e., IoT devices with relaxed, or lower, capability parameters, such as lower throughput, relaxed delay requirements, lower energy consumption, etc.), which results in lower positioning accuracy. As another example, a low-tier UE's receive processing capability may be limited due to its lower cost RF/baseband. As such, the reliability of measurements and positioning computations would be reduced. In addition, such a low-tier UE may not be able to receive multiple PRS from multiple TRPs, further reducing positioning accuracy. As yet another example, the transmit power of a low-tier UE may be reduced, meaning there would be a lower quality of uplink measurements for low-tier UE positioning.

Premium UEs generally have a larger form factor and are costlier than low-tier UEs, and have more features and capabilities than low-tier UEs. For example, with respect to positioning, a premium UE may operate on the full PRS bandwidth, such as 100 MHz, and measure PRS from more TRPs than low-tier UEs, both of which result in higher positioning accuracy. As another example, a premium UE's receive processing capability may be higher (e.g., faster) due to its higher-capability RF/baseband. In addition, the transmit power of a premium UE may be higher than that of a low-tier UE. As such, the reliability of measurements and positioning computations would be increased.

In recent years, there has been a growing concern over the power consumed by cellular networks (e.g., by RAN components such as gNB and/or core network components) due to environmental factors such as carbon emissions. In addition, the power consumption of cellular networks may very expensive as well. As a result, network energy efficiency is an important design criterion for cellular network deployments.

Power consumption of base stations (or gNBs) is a particular contributor to cellular network power consumption. A high power consumption component of such base stations is the power amplifier (PA), which generally accepts an input signal at a certain input power, applies a gain to the input signal to produce a power-amplified version of the input signal, and then transmits the power-amplified signal via transmit antenna(s).

At the same time, 5G uses signals with high peak-to-average power ratios (PAPRs). PAPRs are usually expressed in dB, and represent the power level of the highest instantaneous power compared to the average power level. Power backoff in an amplifier is a power level below the saturation point (e.g., associated with a non-linear region of operation) at which the amplifier will continue to operate in the linear region even if there is a slight increase in the input power level. Usually, power amplifiers operate close to the saturation point as that is where efficiency is maximum. The use of high PAPRs leads to large power backoff required at the PA inputs and relatively poor power efficiency. As cellular networks adopt higher carrier frequencies, the power consumption of the PA components is expected to increase (e.g., both because of more antenna elements and proportionally poorer PA efficiency at those higher frequencies).

Current gNB transmitter emission requirements (or more generally, downlink transmission requirements) include:
  Error vector magnitude (EVM) Requirement: EVM is a requirement for the quality of the in-band transmission, and represents a difference (in dB or %) between the error of the Tx signal and a reference error threshold.
  Adjacent carrier leakage ratio (ACLR) Requirement: ACLR is the relative power of the in-band transmission to the power in the neighboring out-of-band (OOB) frequencies.
  Mask Requirement: The mask requirement is an absolute power emission requirement in the OOB frequencies.

These downlink transmission requirements place constraint(s) on the gNB PAs input power (e.g., minimal backoff) and, as a result, on the power efficiency of the gNB PAs. In some designs, the above-noted downlink transmission requirements may be looked up via respective pre-defined tables (e.g., in the relevant 3GPP standard), e.g.:

TABLE 1

Pre-Defined EVM Requirement Example

| Modulation Scheme for PDSCH | Required EVM (%) | EVM (dB) |
|---|---|---|
| QPSK | 17.5 | −15.1 |
| 16QAM | 12.5 | −18 |
| 64QAM | 8 | −21.9 |
| 256QAM | 3.5 | −29.1 |

TABLE 2

Pre-Defined ACLR Requirement Example

| BS Channel Bandwidth (MHz) | Carrier Frequency Range (GHz) | ACLR Limit (dB) |
|---|---|---|
| 50, 100, 200, 400 | 24.25-33.4 | 28 |
| 50, 100, 200, 400 | 37-52.6 | 26 |

TABLE 3

Pre-Defined Mask Requirement Example

| BS Class | ACLR Absolute Limit |
|---|---|
| Wide Area BS | −13 dBm/MHz |
| Medium Range BS | −20 dBm/MHz |
| Local Area BS | −20 dBm/MHz |

In current cellular network deployments, the various downlink transmission requirements (e.g., EVM, ACLR and/or Mask requirements as depicted in Tables 1-3) are pre-defined (or fixed) irrespective of factors such as network conditions, UE capability (e.g., low-tier vs. premium UE), vendor-specific frequencies, and so on. Hence, such pre-defined downlink transmission requirements generally are set to relatively conservative levels so as to facilitate good performance despite these operational disparities.

Aspects of the disclosure are directed to downlink transmission requirement(s) that are determined based at least in part on a downlink compensation capability of UE(s). Such aspects may provide various technical advantages, such as a more flexible (or dynamic) allocation of downlink transmission requirement(s) (e.g., EVM, ACLR and/or Mask requirements) which may facilitate a reduction to overall network power consumption (e.g., in some cases this may involve an increase in instantaneous transmission power, although the net or aggregate amount of power used to transmit a given amount of data is lowered, e.g., with a higher data rate transmission).

Figure 6:
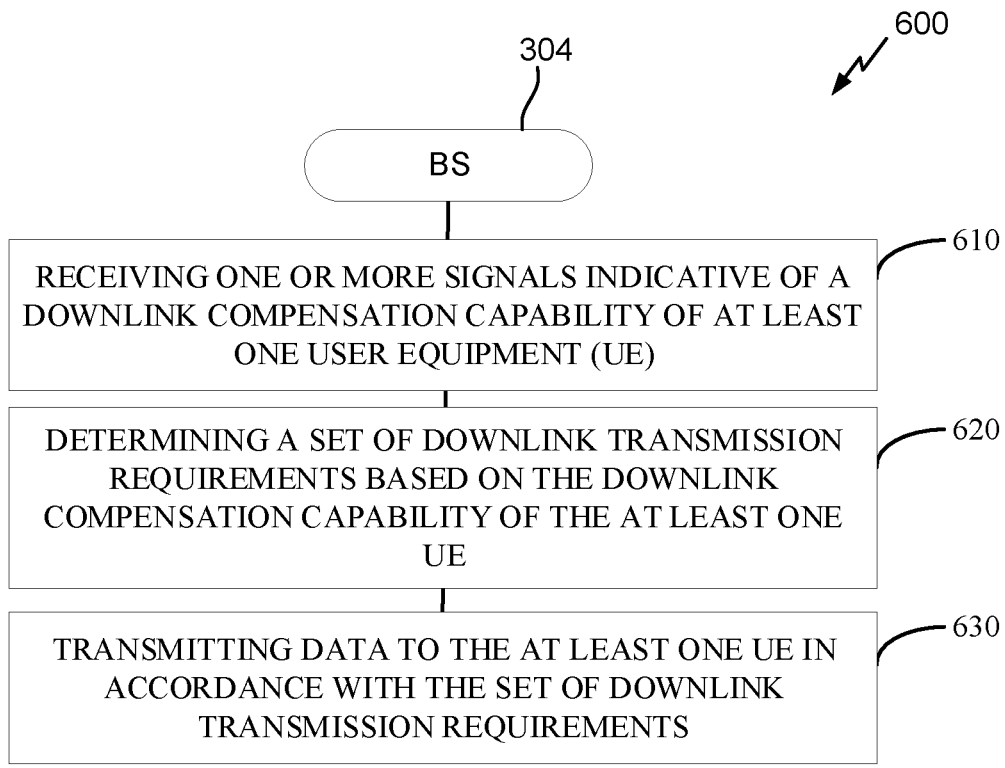
FIG. 6 illustrates an exemplary process of communications according to an aspect of the disclosure.

FIG. 6 illustrates an exemplary process 600 of communications according to an aspect of the disclosure. The process 600 of FIG. 6 is performed by a BS, which may correspond to BS 304 as an example.

Referring to FIG. 6, at 610, BS 304 (e.g., receiver 352 or 362, etc.) receives one or more signals indicative of a downlink compensation capability of at least one UE. In some designs, the downlink compensation capability may correspond to a non-linear compensation capability (e.g., an extent to which a respective UE may corrects non-linearities in an in-band transmission directed to the respective UE). In other designs, the downlink compensation capability may correspond to a degree to which a respective UE can tolerate interference (e.g., measured in terms of SNR or RSRQ, etc.) from non-linear transmissions of a gNB to neighboring UEs (e.g., such non-linear transmissions may be characterized as in-band transmissions to their intended target while creating out-of-band (OOB) emissions that cause in-band interference to the respective UE). In some designs, the one or more signals may directly indicate the downlink compensation capability (e.g., UE capability message). In other designs, the one or more signals may implicitly indicate the downlink compensation capability indirectly (e.g., the UE(s) may provide feedback that indicates a degree to which the UE(s) were able to compensate for various downlink conditions, such as non-linear in-band compensation or compensation of a number of UEs that are FDM'd in a frequency range). For example, as more UEs are FDMed, out-of-band (OOB) emissions will occur, which increases interference to neighboring UEs. Different UEs may have different capabilities in terms of handling such interference, and, in some designs, one way to indicate an interference compensation capability may be to indicate a number of UEs for which FDM'ing on the bandwidth is supported for a respective UE.

Referring to FIG. 6, at 620, BS 304 (e.g., processor(s) 332, downlink transmission component 388, etc.) determines a set of downlink transmission requirements based on the downlink compensation capability of the at least one UE. In some designs, the set of downlink transmission requirements may include an EVM requirement, an ACLR requirement, a mask requirement, or a combination thereof. In some designs, the downlink transmission requirement(s) may be set to some default level if the downlink compensation capability is below some threshold, and may be set to a different level (e.g., more power optimal) if the downlink compensation capability is not below the threshold.

Referring to FIG. 6, at 630, BS 304 (e.g., transmitter 354 or 364, etc.) transmits data to the at least one UE in accordance with the set of downlink transmission requirements. As noted above, in some designs, the transmission at 630 may use legacy (or default) downlink transmission requirement(s) such as those depicted above in Tables 1-3 (e.g., in case of transmission of data to UE(s) with limited downlink compensation capability below some threshold). In other designs, assuming the UE(s) have sufficient downlink compensation capability, the transmission at 630 may use downlink transmission requirement(s) associated with lower overall power consumption (e.g., joules per bit) as compared to transmission of the same data using the legacy (or default) downlink transmission requirement(s) such as those depicted above in Tables 1-3.

Figure 7:
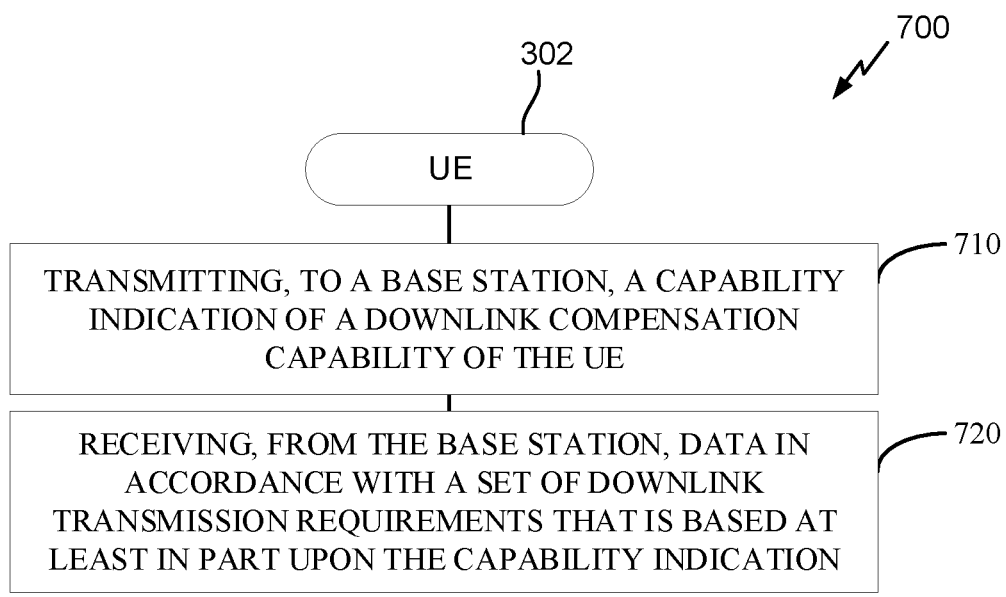
FIG. 7 illustrates an exemplary process of communications according to an aspect of the disclosure.

FIG. 7 illustrates an exemplary process 700 of communications according to an aspect of the disclosure. The process 700 of FIG. 7 is performed by a UE, which may correspond to UE 302 as an example.

Referring to FIG. 7, at 710, UE 302 (e.g., transmitter 314 or 324, etc.) transmits, to a base station, a capability indication (e.g., UE capability message) of a downlink compensation capability of the UE. In some designs, the UE is an in-band UE in communication with the base station over an in-band frequency range, and the downlink compensation capability includes a non-linear compensation capability of the in-band UE. In some designs, the capability indication may be transmitted via RRC signaling (e.g., during an Attach procedure, etc.).

Referring to FIG. 7, at 720, UE 302 (e.g., receiver 312 or 322, etc.) receives, from the base station, data in accordance with a set of downlink transmission requirements that is based at least in part upon the capability indication. In some designs, the set of downlink transmission requirements may include an EVM requirement, an ACLR requirement, a mask requirement, or a combination thereof. In some designs, the downlink transmission requirement(s) may be set to some default level if the capability indication indicates a downlink compensation capability below some threshold, and may be set to a different level (e.g., more power optimal) if the capability indication indicates a downlink compensation capability that is not below the threshold. In some designs, the reception at 720 may use legacy (or default) downlink transmission requirement(s) such as those depicted above in Tables 1-3 (e.g., in case UE has limited downlink compensation capability below some threshold). In other designs, assuming the UE has sufficient downlink compensation capability, the reception at 720 may use downlink transmission requirement(s) associated with lower overall power consumption (e.g., joules per bit) as compared to transmission of the same data using the legacy (or default) downlink transmission requirement(s) such as those depicted above in Tables 1-3.

Referring to FIGS. 6-7, in some designs, the at least one UE includes an in-band UE in communication with the base station over an in-band frequency range (e.g., a portion of spectrum that is allocated specifically to the respective in-band UE, as spectrum allocated to another UE). In this case, the downlink compensation capability comprises a non-linear compensation capability of the in-band UE. For example, the non-linear compensation capability may vary based on various parameters, such as UE type (e.g., premium UEs may have higher non-linear compensation capability than low-tier UEs such as RedCap UEs or NR-Light UEs), network conditions (e.g., UE very close to BS with good channel condition may have more capability to compensate for non-linear distortion than an edge-located UE with poor channel condition), vendor-specific frequency, etc.

Referring to FIGS. 6-7, in some designs, the set of downlink transmission requirements includes an EVM requirement (e.g., as in Table 1). In a specific example, Table 1 may be used as a default set of EVM requirements, and more relaxed (e.g., higher) EVM requirements may be implemented for UEs with a non-linear compensation capability that is above a threshold. For example, a higher EVM requirement means that a greater amount of error (in % or dB) is permitted between a transmission signal and a reference error threshold. Hence, increasing the EVM requirement functions to relax the transmission requirement (e.g., the transmission signal is permitted to arrive at the UE at lower quality, which certain UEs such as premium UEs may be capable of tolerating), which in turn may allow the transmission signal to reduce power (e.g., either by reducing lower transmission power level directly, or alternatively increasing the data rate of the transmission signal to increase the energy efficiency of the data transfer).

Referring to FIGS. 6-7, in some designs, the one or more signals include a capability indication from the in-band UE. However, in other designs, the one or more signals may include UE feedback associated with one or more compressed or non-linearly distorted downlink reference signals. For example, BS 304 may transmit one or more compressed and non-linearly distorted downlink reference signals to test the non-linear compensation capability of a particular UE. The UE will attempt to decode the one or more compressed or non-linearly distorted downlink reference signals, and provide feedback to BS 304 (e.g., SNR, ACK(s) or NACK(s), etc.). From this feedback, BS 304 may infer the non-linear compensation capability of the UE. In a specific example, the one or more compressed and non-linearly distorted downlink reference signals may correspond to one or more channel state information (CSI) reference signals (e.g., minimal EVM is dynamically determined as a results of the CSI-RS UE responses). In some designs, the one or more compressed and non-linearly distorted signals may include a plurality of compressed and non-linearly distorted signals that are associated with different degrees of compression. In this case, the UE may be classified more precisely in terms of its respective non-linear compensation capability based on the highest level of compression at which the reference signal is received at the UE above some quality threshold (e.g., the non-linear compensation capability of the in-band UE may correspond to a highest degree of compression from the different degrees of compression that the in-band UE is capable of tolerating).

Referring to FIGS. 6-7, in some designs, the set of downlink transmission requirements defines at least one constraint associated with input power to a power amplifier (PA), PA gain, or both, at the base station, and the at least one constraint sets a different amount of input power to the PA, a higher PA gain, or both, relative to a default set of downlink transmission requirements (e.g., the default set of downlink transmission requirements depicted in Tables 1-3 above, or some other default set of downlink transmission requirements). In some designs, the input power to the PA can be increased to facilitate a higher data rate transmission to the UE (e.g., more instantaneous power is used, but less overall power consumption or joules per bit is used for the overall transport of the downlink data). In other designs, the input power to the PA (e.g., in terms of the power supply voltage) can be decreased to reduce instantaneous power consumption at the UE (e.g., if same data rate can be supported at lower power consumption level due to a lower power supply voltage, then the input power to the PA can be lowered to save power). In other designs, higher PA gain can be implemented (e.g., this increases non-linear distortion as noted above, the gNB can use higher PA gain for particular UEs known to have a high capability to tolerate non-linear distortion).

Referring to FIGS. 6-7, in some designs, the at least one UE may include a set of UEs that are FDM'd in a slot of a frequency range. In an example, the one or more signals include signal quality feedback associated with one or more downlink signals transmitted by the base station to the set of UEs during the slot (e.g., signal-to-noise ratio (SNR) measurement or a reference signal received quality (RSRQ) measurement). The base station may then use the signal quality feedback to make decisions, such as a joint decision for sum throughput in the cell and/or a joint decision for multiple cells (e.g., to control inter-cell interference as a result of FDM'd transmissions on the frequency range). In some designs, in case of OOB compensation capability (e.g., a capability of a respective UE to tolerate interference from OOB emissions of FDM'd UEs), the set of downlink transmission requirements may include an ACLR requirement, a mask requirement, or both. In some designs, for each UE in the set of UEs, the set of downlink transmission requirements is set to a default set of downlink transmission requirements (e.g., as in Tables 1-3) if the OOB compensation capability of the respective UE is below a threshold (e.g., for low-tier UEs or UEs in poor channel condition environment, etc.), and the set of downlink transmission requirements is set to a dynamic set of downlink transmission requirements different than the default set of downlink requirements if the OOB compensation capability of the respective UE is not below the threshold (e.g., for premium UEs or UEs in good channel condition environment, etc.).

Referring to FIGS. 6-7, in case of OOB compensation capability, in some designs, the set of downlink transmission requirements may define at least one constraint associated with input power to a PA, PA gain, or both, at the base station, and the at least one constraint may set a different a different amount of input power to the PA a higher PA gain, or both, relative to the default set of downlink transmission requirements Referring to FIGS. 6-7, in case of OOB compensation capability, in some designs, the set of downlink transmission requirements may be set to a default set of downlink transmission requirements (e.g., Tables 1-3) irrespective of the OOB compensation capability of the respective UE if the respective UE is operating at a frequency range within a threshold to an edge of an in-band frequency range (e.g., to prevent leakage to licensed vendor-specific frequencies). For example, the OOB relaxation may not be permitted for UEs at the edge of the vendor allocated frequency to prevent leakage to other vendor frequencies—e.g., relaxation can be only used within vendor frequencies (e.g., which may still be significant, e.g., in FR2 in many cases, allocated frequencies could span 1.2-1.4 GHz while BW in ACLR tests is measured is 100/200/400 MHz within that band).

Referring to FIGS. 6-7, in case of operation with FDM'd UEs, in a specific example, the respective FDM'd UEs may report, based on gNB request, their SNR and/or RSRQ (e.g., of signal(s) in a particular FDM'd slot). Based on the SNR and/or RSRQ, gNB can evaluate what interference level (e.g., which may be substantially attributable to OOB emissions from FDM'd transmissions of other UEs) can be tolerated by a respective UE. In some designs, gNB can use this measurement data (e.g., SNR and/or RSRQ) to understand SNR associated with the respective UE with no OOB interference, with OOB interference or both. gNB can then make joint decision for all FDM'd UEs to maximize the sum throughput in the cell. In some designs, the set of downlink transmission requirements is further based on one or more inter-cell interference parameters. For example, gNBs can make joint decision for multiple cells considering inter-cell interference as a result of FDM'd transmissions on the frequency range. In some designs, gNB may control the tradeoff between EVM and OOB emissions (e.g., an amount of energy on the frequency range due to the FDM'd transmissions) by utilizing digital pre-distortion (DPD) function that is configured to emphasize either in-band or OOB emissions or any mixture thereof (e.g., depending upon priorities of the network operator). DPD functions are used to increase linearity and/or compensate for non-linearity in PAs by applying inverse distortion at the input signal of the PA to cancel the distortion generated by the PA (e.g., generally, the use of DPD functions requires knowledge of the PA characteristics to accurately apply the inverse distortion). In some designs, if gNB understands that a certain UE is highly tolerant to FDM'd transmissions (e.g., capable of maintaining a performance level above a performance threshold in an environment where an interference level due to FDM'd transmissions associated with other UE(s) is above an interference threshold), gNB may compress the signal of neighboring UEs to increase their respective OOB emissions (e.g., which may allow gNB to increase the data rate to the neighboring UEs, etc.).

Figure 8:
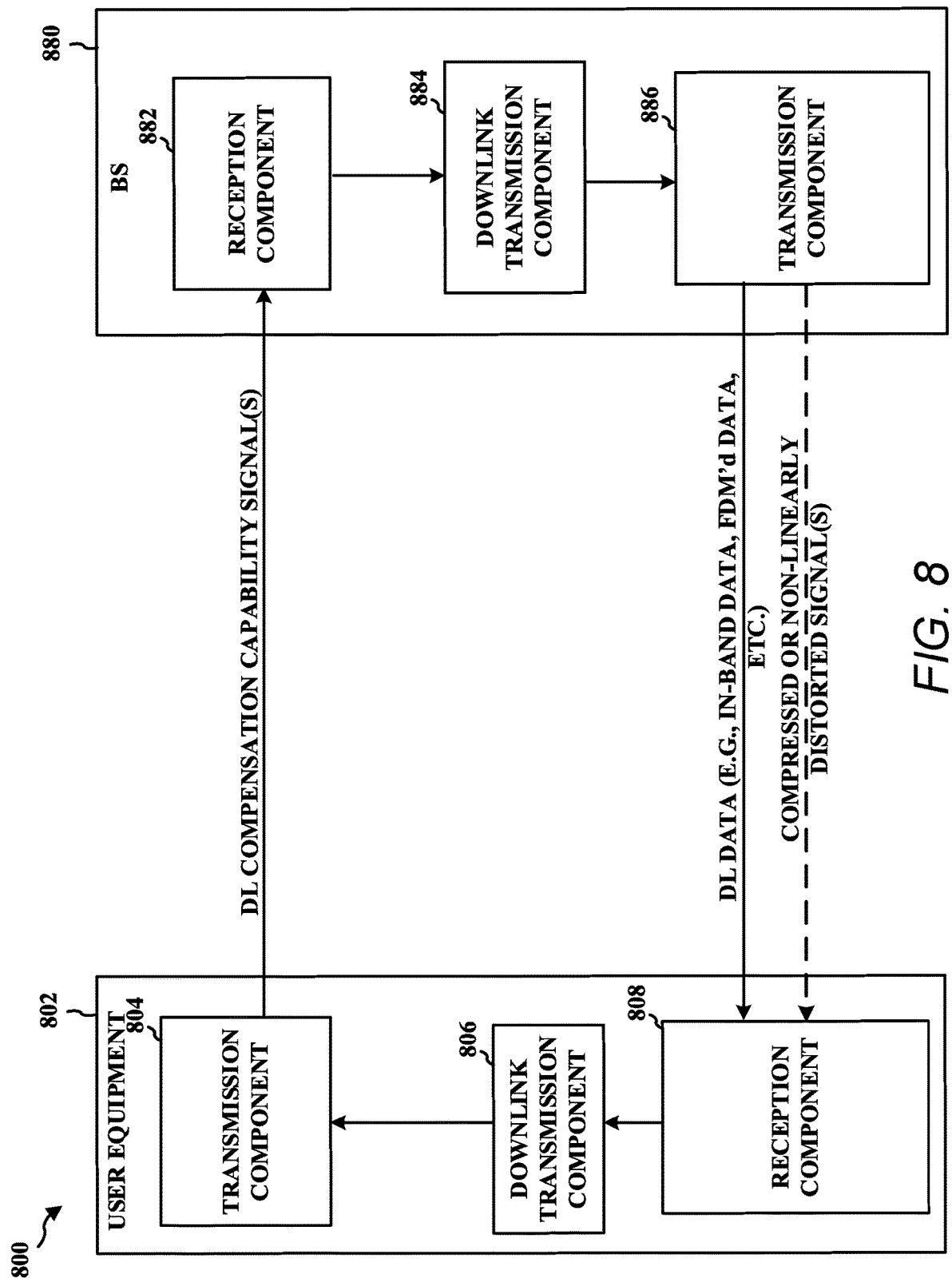
FIG. 8 is a conceptual data flow diagram illustrating the data flow between different means/components in exemplary apparatuses in accordance with an aspect of the disclosure.

FIG. 8 is a conceptual data flow diagram 800 illustrating the data flow between different means/components in exemplary apparatuses 802 and 880 in accordance with an aspect of the disclosure. The apparatus 802 may be a UE (e.g., UE 302) in communication with an apparatus 880, which may be a base station (e.g., BS 304).

The apparatus 802 includes a transmission component 804, which may correspond to transmitter circuitry in UE 302 as depicted in FIG. 3A, including transmitter(s) 314 and 324, antenna(s) 316 and 326, etc. The apparatus 802 further includes downlink transmission component 806, which may correspond to processor circuitry in UE 302 as depicted in FIG. 3A, including processing system 332, etc. The apparatus 802 further includes a reception component 808, which may correspond to receiver circuitry in UE 302 as depicted in FIG. 3A, including receiver(s) 312 and 322, antenna(s) 316 and 326, etc.

The apparatus 880 includes a transmission component 886, which may correspond to transmitter circuitry in BS 304 as depicted in FIG. 3B, including transmitter(s) 354 and 364, antenna(s) 356 and 366, etc. The apparatus 880 further includes downlink transmission component 884, which may correspond to processor circuitry in BS 304 as depicted in FIG. 3B, including processing system 384, etc. The apparatus 880 further includes a reception component 882, which may correspond to receiver circuitry in BS 304 as depicted in FIG. 3B, including receiver(s) 352 and 362, antenna(s) 356 and 366, etc.

Referring to FIG. 8, The downlink transmission component 804 directs the transmission component 804 to transmit downlink compensation capability signal(s) (e.g., SNR/RSRQ to FDM'd signal(s), feedback to compressed or non-linearly distorted signal(s), a direct capability indication, etc.) to the reception component 882. In some designs, the downlink compensation capability signal(s) include feedback to optional compressed or non-linearly distorted signal(s) received at the reception component 808 from the transmission component 886 which are used to test the non-linear compensation capability of the UE. In other designs, the downlink compensation capability signal(s) may include a capability indication (e.g., a direct indication of the downlink compensation capability of the UE, rather than an indirect indication via signal feedback). In other designs, the downlink compensation capability signal(s) include feedback to optional FDM'd signal(s) received at the reception component 808 from the transmission component 886 which are used to test the capability of the UE to handle FDM'd transmissions with other UE(s). Hence, the downlink compensation capability may correspond to a non-linear compensation capability (e.g., an extent to which a respective UE may corrects non-linearities in an in-band transmission directed to the respective UE), or to a degree to which a respective UE can tolerate interference (e.g., measured in terms of SNR or RSRQ, etc.) from non-linear transmissions of a gNB to neighboring UEs (e.g., such non-linear transmissions may be characterized as in-band transmissions to their intended target while creating out-of-band (OOB) emissions that cause in-band interference to the respective UE). The downlink transmission component 884 evaluates the downlink compensation capability signal(s) and dynamically determines a set of downlink transmission requirements. Downlink data (e.g., in-band data, FMD'd data that may cause some amount of OOB interference, etc.) is transmitted by the transmission component 886 to the reception component 808 based on the dynamically determined set of downlink transmission requirements (e.g., EVM requirement, ACLR requirement, mask requirement, etc.).

One or more components of the apparatus 802 and apparatus 880 may perform each of the blocks of the algorithm in the aforementioned flowcharts of FIGS. 6-7. As such, each block in the aforementioned flowcharts of FIGS. 6-7 may be performed by a component and the apparatus 802 and apparatus 880 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
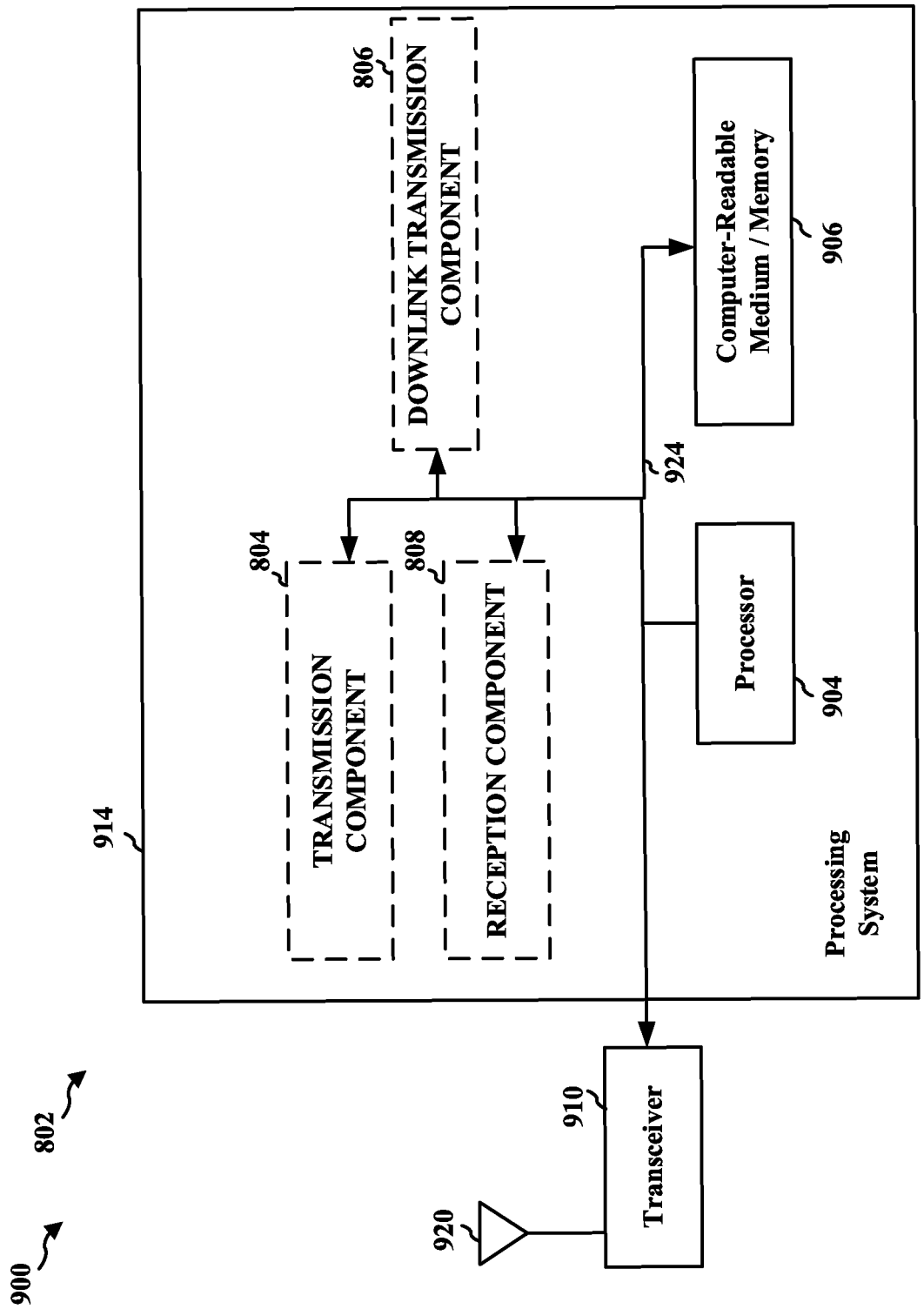
FIGS. 9-10 are diagrams illustrating examples of hardware implementations for apparatuses employing processing systems.

FIG. 9 is a diagram 900 illustrating an example of a hardware implementation for an apparatus 802 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806 and 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 808. In addition, the transceiver 910 receives information from the processing system 914, specifically the transmission component 804, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806 and 808. The components may be software components running in the processor 904, resident/stored in the computer readable medium/memory 906, one or more hardware components coupled to the processor 904, or some combination thereof.

In one configuration, the apparatus 802 (e.g., a UE) for wireless communication includes means for transmitting, to a base station, a capability indication of a downlink compensation capability of the UE, and means for receiving, from the base station, data in accordance with a set of downlink transmission requirements that is based at least in part upon the capability indication.

The aforementioned means may be one or more of the aforementioned components of the apparatus 802 and/or the processing system 914 of the apparatus 802 configured to perform the functions recited by the aforementioned means.

Figure 10:
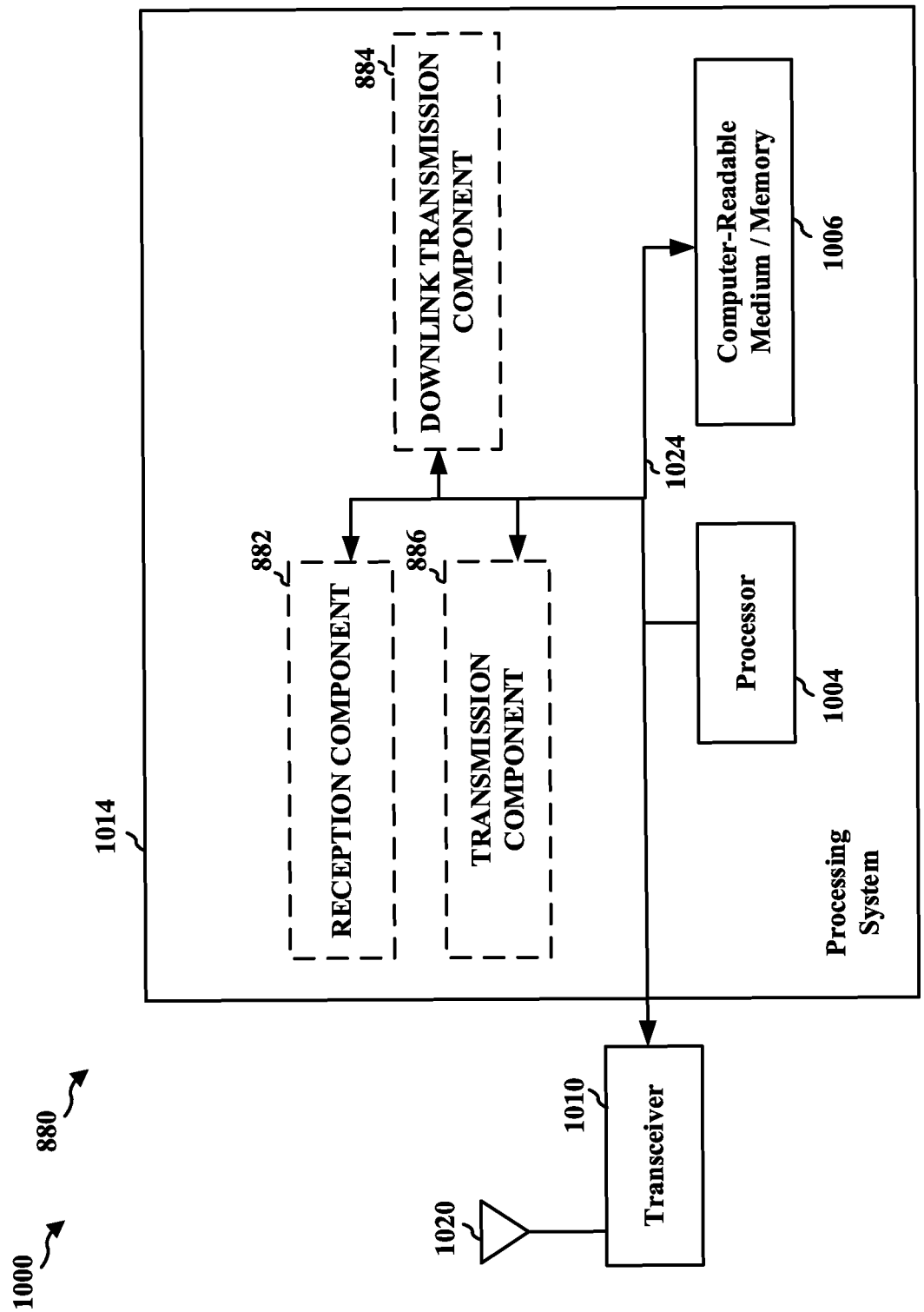

FIG. 10 is a diagram 1000 illustrating an example of a hardware implementation for an apparatus 880 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 882, 884 and 886, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 882. In addition, the transceiver 1010 receives information from the processing system 1014, specifically the transmission component 886, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 882, 884 and 886. The components may be software components running in the processor 1004, resident/stored in the computer readable medium/memory 1006, one or more hardware components coupled to the processor 1004, or some combination thereof.

In one configuration, the apparatus 880 (e.g., a BS) for wireless communication may include means for receiving one or more signals indicative of a downlink compensation capability of at least one user equipment (UE), means for determining a set of downlink transmission requirements based on the downlink compensation capability of the at least one UE, and means for transmitting data to the at least one UE in accordance with the set of downlink transmission requirements.

The aforementioned means may be one or more of the aforementioned components of the apparatus 880 and/or the processing system 1014 of the apparatus 880 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a base station, comprising: receiving one or more signals indicative of a downlink compensation capability of at least one user equipment (UE); determining a set of downlink transmission requirements based on the downlink compensation capability of the at least one UE; and transmitting data to the at least one UE in accordance with the set of downlink transmission requirements.

Clause 2. The method of clause 1, wherein the at least one UE comprises an in-band UE in communication with the base station over an in-band frequency range, and wherein the downlink compensation capability comprises a non-linear compensation capability of the in-band UE.

Clause 3. The method of clause 2, wherein the set of downlink transmission requirements comprises an error vector magnitude (EVM) requirement.

Clause 4. The method of any of clauses 2 to 3, wherein the one or more signals comprise a capability indication from the in-band UE.

Clause 5. The method of any of clauses 2 to 4, wherein the one or more signals comprise UE feedback associated with one or more compressed or non-linearly distorted downlink reference signals.

Clause 6. The method of clause 5, wherein the one or more compressed and non-linearly distorted downlink reference signals correspond to one or more channel state information (CSI) reference signals.

Clause 7. The method of clause 6, wherein the one or more compressed and non-linearly distorted signals comprise a plurality of compressed and non-linearly distorted signals that are associated with different degrees of compression.

Clause 8. The method of clause 7, wherein the non-linear compensation capability of the in-band UE corresponds to a highest degree of compression from the different degrees of compression that the in-band UE is capable of tolerating.

Clause 9. The method of any of clauses 2 to 8, wherein the set of downlink transmission requirements defines at least one constraint associated with input power to a power amplifier (PA), PA gain, or both, at the base station, and wherein the at least one constraint sets a different amount of input power to the PA, a higher PA gain, or both, relative to a default set of downlink transmission requirements.

Clause 10. The method of any of clauses 1 to 9, wherein the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

Clause 11. The method of clause 10, wherein the signal quality feedback comprises a signal-to-noise ratio (SNR) measurement or a reference signal received quality (RSRQ) measurement.

Clause 12. The method of any of clauses 10 to 11, wherein the set of downlink transmission requirements comprises an adjacent carrier leakage ratio (ACLR) requirement, a mask requirement, or a combination thereof.

Clause 13. The method of any of clauses 10 to 12, wherein, for each UE in the set of UEs: the set of downlink transmission requirements is set to a default set of downlink transmission requirements if the OOB compensation capability of the respective UE is below a threshold, and wherein the set of downlink transmission requirements is set to a dynamic set of downlink transmission requirements different than the default set of downlink requirements if the OOB compensation capability of the respective UE is not below the threshold.

Clause 14. The method of clause 13, wherein the set of downlink transmission requirements defines at least one constraint associated with input power to a power amplifier (PA), PA gain, or both, at the base station, and wherein the at least one constraint sets a different a different amount of input power to the PA a higher PA gain, or both, relative to the default set of downlink transmission requirements.

Clause 15. The method of any of clauses 10 to 14, wherein the set of downlink transmission requirements is set to a default set of downlink transmission requirements irrespective of the OOB compensation capability of the respective UE if the respective UE is operating at a frequency range within a threshold to an edge of an in-band frequency range.

Clause 16. The method of any of clauses 10 to 15, wherein the set of downlink transmission requirements is further based on one or more inter-cell interference parameters.

Clause 17. A method of operating a user equipment (UE), comprising: transmitting, to a base station, a capability indication of a downlink compensation capability of the UE; and receiving, from the base station, data in accordance with a set of downlink transmission requirements that is based at least in part upon the capability indication.

Clause 18. The method of clause 17, wherein the UE is an in-band UE in communication with the base station over an in-band frequency range, and wherein the downlink compensation capability comprises a non-linear compensation capability of the in-band UE.

Clause 19. The method of clause 18, wherein the set of downlink transmission requirements comprises an error vector magnitude (EVM) requirement.

Clause 20. The method of any of clauses 18 to 19, wherein the set of downlink transmission requirements sets at least one constraint associated with input power to a power amplifier (PA), PA gain, or both, at the base station, and wherein the at least one constraint sets a different amount of input power to the PA a higher PA gain, or both, relative to a default set of downlink transmission requirements.

Clause 21. A base station, comprising: a memory; at least one transceiver; and at least one processor communicatively coupled to the memory and the at least one transceiver, the at least one processor configured to: receive, via the at least one transceiver, one or more signals indicative of a downlink compensation capability of at least one user equipment (UE); determine a set of downlink transmission requirements based on the downlink compensation capability of the at least one UE; and transmit, via the at least one transceiver, data to the at least one UE in accordance with the set of downlink transmission requirements.

Clause 22. The base station of clause 21, wherein the at least one UE comprises an in-band UE in communication with the base station over an in-band frequency range, and wherein the downlink compensation capability comprises a non-linear compensation capability of the in-band UE.

Clause 23. The base station of clause 22, wherein the set of downlink transmission requirements comprises an error vector magnitude (EVM) requirement.

Clause 24. The base station of clause 22, wherein the one or more signals comprise a capability indication from the in-band UE.

Clause 25. The base station of clause 22, wherein the one or more signals comprise UE feedback associated with one or more compressed or non-linearly distorted downlink reference signals.

Clause 26. The base station of clause 25, wherein the one or more compressed and non-linearly distorted downlink reference signals correspond to one or more channel state information (CSI) reference signals.

Clause 27. The base station of clause 26, wherein the one or more compressed and non-linearly distorted signals comprise a plurality of compressed and non-linearly distorted signals that are associated with different degrees of compression.

Clause 28. The base station of clause 27, wherein the non-linear compensation capability of the in-band UE corresponds to a highest degree of compression from the different degrees of compression that the in-band UE is capable of tolerating.

Clause 29. The base station of clause 22, wherein the set of downlink transmission requirements defines at least one constraint associated with input power to a power amplifier (PA), PA gain, or both, at the base station, and wherein the at least one constraint sets a different amount of input power to the PA, a higher PA gain, or both, relative to a default set of downlink transmission requirements.

Clause 30. The base station of any of clauses 21 to 29, wherein the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

Clause 31. The base station of clause 30, wherein the signal quality feedback comprises a signal-to-noise ratio (SNR) measurement or a reference signal received quality (RSRQ) measurement.

Clause 32. The base station of any of clauses 30 to 31, wherein the set of downlink transmission requirements comprises an adjacent carrier leakage ratio (ACLR) requirement, a mask requirement, or a combination thereof.

Clause 33. The base station of any of clauses 30 to 32, wherein, for each UE in the set of UEs: the set of downlink transmission requirements is set to a default set of downlink transmission requirements if the OOB compensation capability of the respective UE is below a threshold, and wherein the set of downlink transmission requirements is set to a dynamic set of downlink transmission requirements different than the default set of downlink requirements if the OOB compensation capability of the respective UE is not below the threshold.

Clause 34. The base station of clause 33, wherein the set of downlink transmission requirements defines at least one constraint associated with input power to a power amplifier (PA), PA gain, or both, at the base station, and wherein the at least one constraint sets a different a different amount of input power to the PA a higher PA gain, or both, relative to the default set of downlink transmission requirements.

Clause 35. The base station of any of clauses 30 to 34, wherein the set of downlink transmission requirements is set to a default set of downlink transmission requirements irrespective of the OOB compensation capability of the respective UE if the respective UE is operating at a frequency range within a threshold to an edge of an in-band frequency range.

Clause 36. The base station of any of clauses 30 to 35, wherein the set of downlink transmission requirements is further based on one or more inter-cell interference parameters.

Clause 37. A user equipment (UE), comprising: a memory; at least one transceiver; and at least one processor communicatively coupled to the memory and the at least one transceiver, the at least one processor configured to: transmit, via the at least one transceiver, to a base station, a capability indication of a downlink compensation capability of the UE; and receive, via the at least one transceiver, from the base station, data in accordance with a set of downlink transmission requirements that is based at least in part upon the capability indication.

Clause 38. The UE of clause 37, wherein the UE is an in-band UE in communication with the base station over an in-band frequency range, and wherein the downlink compensation capability comprises a non-linear compensation capability of the in-band UE.

Clause 39. The UE of clause 38, wherein the set of downlink transmission requirements comprises an error vector magnitude (EVM) requirement.

Clause 40. The UE of any of clauses 38 to 39, wherein the set of downlink transmission requirements sets at least one constraint associated with input power to a power amplifier (PA), PA gain, or both, at the base station, and wherein the at least one constraint sets a different amount of input power to the PA a higher PA gain, or both, relative to a default set of downlink transmission requirements.

Clause 41. A base station, comprising: means for receiving one or more signals indicative of a downlink compensation capability of at least one user equipment (UE); means for determining a set of downlink transmission requirements based on the downlink compensation capability of the at least one UE; and means for transmitting data to the at least one UE in accordance with the set of downlink transmission requirements.

Clause 42. The base station of clause 41, wherein the at least one UE comprises an in-band UE in communication with the base station over an in-band frequency range, and wherein the downlink compensation capability comprises a non-linear compensation capability of the in-band UE.

Clause 43. The base station of clause 42, wherein the set of downlink transmission requirements comprises an error vector magnitude (EVM) requirement.

Clause 44. The base station of any of clauses 42 to 43, wherein the one or more signals comprise a capability indication from the in-band UE.

Clause 45. The base station of any of clauses 42 to 44, wherein the one or more signals comprise UE feedback associated with one or more compressed or non-linearly distorted downlink reference signals.

Clause 46. The base station of clause 45, wherein the one or more compressed and non-linearly distorted downlink reference signals correspond to one or more channel state information (CSI) reference signals.

Clause 47. The base station of clause 46, wherein the one or more compressed and non-linearly distorted signals comprise a plurality of compressed and non-linearly distorted signals that are associated with different degrees of compression.

Clause 48. The base station of clause 47, wherein the non-linear compensation capability of the in-band UE corresponds to a highest degree of compression from the different degrees of compression that the in-band UE is capable of tolerating.

Clause 49. The base station of any of clauses 42 to 48, wherein the set of downlink transmission requirements defines at least one constraint associated with input power to a power amplifier (PA), PA gain, or both, at the base station, and wherein the at least one constraint sets a different amount of input power to the PA, a higher PA gain, or both, relative to a default set of downlink transmission requirements.

Clause 50. The base station of any of clauses 41 to 49, wherein the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

Clause 51. The base station of clause 50, wherein the signal quality feedback comprises a signal-to-noise ratio (SNR) measurement or a reference signal received quality (RSRQ) measurement.

Clause 52. The base station of any of clauses 50 to 51, wherein the set of downlink transmission requirements comprises an adjacent carrier leakage ratio (ACLR) requirement, a mask requirement, or a combination thereof.

Clause 53. The base station of any of clauses 50 to 52, wherein, for each UE in the set of UEs: the set of downlink transmission requirements is set to a default set of downlink transmission requirements if the OOB compensation capability of the respective UE is below a threshold, and wherein the set of downlink transmission requirements is set to a dynamic set of downlink transmission requirements different than the default set of downlink requirements if the OOB compensation capability of the respective UE is not below the threshold.

Clause 54. The base station of clause 53, wherein the set of downlink transmission requirements defines at least one constraint associated with input power to a power amplifier (PA), PA gain, or both, at the base station, and wherein the at least one constraint sets a different a different amount of input power to the PA a higher PA gain, or both, relative to the default set of downlink transmission requirements.

Clause 55. The base station of any of clauses 50 to 54, wherein the set of downlink transmission requirements is set to a default set of downlink transmission requirements irrespective of the OOB compensation capability of the respective UE if the respective UE is operating at a frequency range within a threshold to an edge of an in-band frequency range.

Clause 56. The base station of any of clauses 50 to 55, wherein the set of downlink transmission requirements is further based on one or more inter-cell interference parameters.

Clause 57. A user equipment (UE), comprising: means for transmitting, to a base station, a capability indication of a downlink compensation capability of the UE; and means for receiving, from the base station, data in accordance with a set of downlink transmission requirements that is based at least in part upon the capability indication.

Clause 58. The UE of clause 57, wherein the UE is an in-band UE in communication with the base station over an in-band frequency range, and wherein the downlink compensation capability comprises a non-linear compensation capability of the in-band UE.

Clause 59. The UE of clause 58, wherein the set of downlink transmission requirements comprises an error vector magnitude (EVM) requirement.

Clause 60. The UE of any of clauses 58 to 59, wherein the set of downlink transmission requirements sets at least one constraint associated with input power to a power amplifier (PA), PA gain, or both, at the base station, and wherein the at least one constraint sets a different amount of input power to the PA a higher PA gain, or both, relative to a default set of downlink transmission requirements.

Clause 61. A non-transitory computer-readable medium storing computer-executable instructions that, when executed by a base station, cause the base station to: receive one or more signals indicative of a downlink compensation capability of at least one user equipment (UE); determine a set of downlink transmission requirements based on the downlink compensation capability of the at least one UE; and transmit data to the at least one UE in accordance with the set of downlink transmission requirements.

Clause 62. The non-transitory computer-readable medium of clause 61, wherein the at least one UE comprises an in-band UE in communication with the base station over an in-band frequency range, and wherein the downlink compensation capability comprises a non-linear compensation capability of the in-band UE.

Clause 63. The non-transitory computer-readable medium of clause 62, wherein the set of downlink transmission requirements comprises an error vector magnitude (EVM) requirement.

Clause 64. The non-transitory computer-readable medium of any of clauses 62 to 63, wherein the one or more signals comprise a capability indication from the in-band UE.

Clause 65. The non-transitory computer-readable medium of any of clauses 62 to 64, wherein the one or more signals comprise UE feedback associated with one or more compressed or non-linearly distorted downlink reference signals.

Clause 66. The non-transitory computer-readable medium of clause 65, wherein the one or more compressed and non-linearly distorted downlink reference signals correspond to one or more channel state information (CSI) reference signals.

Clause 67. The non-transitory computer-readable medium of clause 66, wherein the one or more compressed and non-linearly distorted signals comprise a plurality of compressed and non-linearly distorted signals that are associated with different degrees of compression.

Clause 68. The non-transitory computer-readable medium of clause 67, wherein the non-linear compensation capability of the in-band UE corresponds to a highest degree of compression from the different degrees of compression that the in-band UE is capable of tolerating.

Clause 69. The non-transitory computer-readable medium of any of clauses 62 to 68, wherein the set of downlink transmission requirements defines at least one constraint associated with input power to a power amplifier (PA), PA gain, or both, at the base station, and wherein the at least one constraint sets a different amount of input power to the PA, a higher PA gain, or both, relative to a default set of downlink transmission requirements.

Clause 70. The non-transitory computer-readable medium of any of clauses 61 to 69, wherein the at least one UE comprises a set of user equipments (UEs) that are frequency-division multiplexed (FDM'd) in a slot of an out-of-band (OOB) frequency range, wherein the one or more signals comprise signal quality feedback associated with one or more downlink signals transmitted by the base station to the set of UEs during the slot, and wherein an amount of the data transmitted to the set of UEs in another slot of the OOB frequency range is based in part upon the signal quality feedback.

Clause 71. The non-transitory computer-readable medium of clause 70, wherein the signal quality feedback comprises a signal-to-noise ratio (SNR) measurement or a reference signal received quality (RSRQ) measurement.

Clause 72. The non-transitory computer-readable medium of any of clauses 70 to 71, wherein the set of downlink transmission requirements comprises an adjacent carrier leakage ratio (ACLR) requirement, a mask requirement, or a combination thereof.

Clause 73. The non-transitory computer-readable medium of any of clauses 70 to 72, wherein, for each UE in the set of UEs: the set of downlink transmission requirements is set to a default set of downlink transmission requirements if the OOB compensation capability of the respective UE is below a threshold, and wherein the set of downlink transmission requirements is set to a dynamic set of downlink transmission requirements different than the default set of downlink requirements if the OOB compensation capability of the respective UE is not below the threshold.

Clause 74. The non-transitory computer-readable medium of clause 73, wherein the set of downlink transmission requirements defines at least one constraint associated with input power to a power amplifier (PA), PA gain, or both, at the base station, and wherein the at least one constraint sets a different a different amount of input power to the PA a higher PA gain, or both, relative to the default set of downlink transmission requirements.

Clause 75. The non-transitory computer-readable medium of any of clauses 70 to 74, wherein the set of downlink transmission requirements is set to a default set of downlink transmission requirements irrespective of the OOB compensation capability of the respective UE if the respective UE is operating at a frequency range within a threshold to an edge of an in-band frequency range.

Clause 76. The non-transitory computer-readable medium of any of clauses 70 to 75, wherein the set of downlink transmission requirements is further based on one or more inter-cell interference parameters.

Clause 77. A non-transitory computer-readable medium storing computer-executable instructions that, when executed by a user equipment (UE), cause the UE to: transmit, to a base station, a capability indication of a downlink compensation capability of the UE; and receive, from the base station, data in accordance with a set of downlink transmission requirements that is based at least in part upon the capability indication.

Clause 78. The non-transitory computer-readable medium of clause 77, wherein the UE is an in-band UE in communication with the base station over an in-band frequency range, and wherein the downlink compensation capability comprises a non-linear compensation capability of the in-band UE.

Clause 79. The non-transitory computer-readable medium of clause 78, wherein the set of downlink transmission requirements comprises an error vector magnitude (EVM) requirement.

Clause 80. The non-transitory computer-readable medium of any of clauses 78 to 79, wherein the set of downlink transmission requirements sets at least one constraint associated with input power to a power amplifier (PA), PA gain, or both, at the base station, and wherein the at least one constraint sets a different amount of input power to the PA a higher PA gain, or both, relative to a default set of downlink transmission requirements.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A network component, comprising:
   a memory;
   at least one transceiver; and
   at least one processor communicatively coupled to the memory and the at least one transceiver, the at least one processor configured to:
      receive, via the at least one transceiver, one or more signals indicative of a downlink compensation capability of at least one user equipment (UE) of a set of UEs that are frequency-division multiplexed (FDM'd) in a slot of a frequency range, the one or more signals comprising signal quality feedback associated with one or more downlink signals transmitted by the network component to the set of UEs during the slot;
      determine a set of downlink transmission requirements based on the downlink compensation capability of the at least one UE, wherein, for each of the at least one UEs, the set of downlink transmission requirements is set to a default set of downlink transmission requirements if the compensation capability of the respective UE is below a threshold, and is set to a set of dynamic downlink transmission requirements different than the default set of downlink requirements if the compensation capability of the respective UE is not below the threshold; and
      transmit, via the at least one transceiver, data to the at least one UE in accordance with the set of downlink transmission requirements,
   wherein the set of downlink transmission requirements comprises a error vector magnitude (EVM) requirement, or
   an adjacent carrier leakage ratio (ACLR) requirement, or
   a mask requirement comprising an absolute power emission requirement in one or more out-of-band (OOB) frequencies, or
   any combination thereof.

2. The network component of claim 1,
   wherein the at least one UE comprises an in-band UE in communication with the network component over an in-band frequency range, and wherein the downlink compensation capability comprises a non-linear compensation capability of the in-band UE.

3. The network component of claim 2, wherein the set of downlink transmission requirements comprises the EVM requirement.

4. The network component of claim 2, wherein the one or more signals comprise UE feedback associated with one or more compressed or non-linearly distorted downlink reference signals.

5. The network component of claim 4, wherein the one or more compressed or the non-linearly distorted downlink reference signals correspond to one or more channel state information (CSI) reference signals.

6. The network component of claim 5, wherein the one or more compressed or the non-linearly distorted signals comprise a plurality of compressed and non-linearly distorted signals that are associated with different degrees of compression.

7. The network component of claim 6, wherein the non-linear compensation capability of the in-band UE corresponds to a highest degree of compression from the different degrees of compression that the in-band UE is capable of tolerating.

8. The network component of claim 2,
wherein the set of downlink transmission requirements defines at least one constraint associated with input power to a power amplifier (PA), PA gain, or both, at the network component, and
wherein the at least one constraint sets a different amount of input power to the PA, a higher PA gain, or both, relative to a default set of downlink transmission requirements.

9. The network component of claim 1, wherein the signal quality feedback comprises a signal-to-noise ratio (SNR) measurement or a reference signal received quality (RSRQ) measurement.

10. The network component of claim 1, wherein the set of downlink transmission requirements comprises the requirement, the mask requirement, or a combination thereof.

11. The network component of claim 1,
wherein the set of downlink transmission requirements defines at least one constraint associated with input power to a power amplifier (PA), PA gain, or both, at the network component, and
wherein the at least one constraint sets a different a different amount of input power to the PA a higher PA gain, or both, relative to the default set of downlink transmission requirements.

12. The network component of claim 1, wherein the set of downlink transmission requirements is set to a default set of downlink transmission requirements irrespective of the OOB compensation capability of the respective UE if the respective UE is operating at a frequency range within a threshold to an edge of an in-band frequency range.

13. The network component of claim 1, wherein the set of downlink transmission requirements is further based on one or more inter-cell interference parameters.

14. A user equipment (UE), comprising:
a memory;
at least one transceiver; and
at least one processor communicatively coupled to the memory and the at least one transceiver, the at least one processor configured to:
transmit, via the at least one transceiver, to a network component, a capability indication of a downlink compensation capability of the UE; and
receive, via the at least one transceiver, from the network component, data in accordance with a set of downlink transmission requirements that is based at least in part upon the capability indication,
wherein the set of downlink transmission requirements is set to a default set of downlink transmission requirements if the downlink compensation capability of the UE is below a threshold, and is set to a set of dynamic downlink transmission requirements different than the default set of downlink transmission requirements if the downlink compensation capability of the UE is not below the threshold;
wherein the set of downlink transmission requirements comprises a error vector magnitude (EVM) requirement, or
an adjacent carrier leakage ratio (ACLR) requirement, or
a mask requirement comprising an absolute power emission requirement in one or more out-of-band (OOB) frequencies, or
any combination thereof.

15. The UE of claim 14,
wherein the UE is an in-band UE in communication with the network component over an in-band frequency range, and
wherein the downlink compensation capability comprises a non-linear compensation capability of the in-band UE.

16. The UE of claim 15, wherein the set of downlink transmission requirements comprises the EVM requirement.

17. The UE of claim 15,
wherein the set of downlink transmission requirements sets at least one constraint associated with input power to a power amplifier (PA), PA gain, or both, at the network component, and
wherein the at least one constraint sets a different amount of input power to the PA a higher PA gain, or both, relative to a default set of downlink transmission requirements.

18. A method of operating a network component, comprising:
receiving one or more signals indicative of a downlink compensation capability of at least one user equipment (UE);
determining a set of downlink transmission requirements based on the downlink compensation capability of the at least one UE, wherein the set of downlink transmission requirements is set to a default set of downlink transmission requirements if the downlink compensation capability of the UE is below a threshold, and is set to a set of dynamic downlink transmission requirements different than the default set of downlink transmission requirements if the downlink compensation capability of the UE is not below the threshold; and
transmitting data to the at least one UE in accordance with the determined set of downlink transmission requirements,
wherein the set of downlink transmission requirements comprises a error vector magnitude (EVM) requirement, or
an adjacent carrier leakage ratio (ACLR) requirement, or
a mask requirement comprising an absolute power emission requirement in one or more out-of-band (OOB) frequencies, or
any combination thereof.

19. The method of claim 18,
wherein the at least one UE comprises an in-band UE in communication with the network component over an in-band frequency range, and
wherein the downlink compensation capability comprises a non-linear compensation capability of the in-band UE.

20. The method of claim 19, wherein the set of downlink transmission requirements comprises the EVM requirement.

21. The method of claim 19, wherein the one or more signals comprise UE feedback associated with one or more compressed or non-linearly distorted downlink reference signals.

22. The method of claim 19,
wherein the set of downlink transmission requirements defines at least one constraint associated with input power to a power amplifier (PA), PA gain, or both, at the network component, and
wherein the at least one constraint sets a different amount of input power to the PA, a higher PA gain, or both, relative to a default set of downlink transmission requirements.

23. The method of claim 18,
wherein the at least one UE comprises a set of user equipments (UEs) that are frequency-division multiplexed (FDM'd) in a slot of a frequency range, and
wherein the one or more signals comprise signal quality feedback associated with one or more downlink signals transmitted by the network component to the set of UEs during the slot.

24. A method of operating a user equipment (UE), comprising:
transmitting, to a network component, a capability indication of a downlink compensation capability of the UE; and
receiving, from the network component, data in accordance with a set of downlink transmission requirements that is based at least in part upon the capability indication,
wherein the set of downlink transmission requirements is set to a default set of downlink transmission requirements if the downlink compensation capability of the UE is below a threshold, and is set to a set of dynamic downlink transmission requirements different than the default set of downlink transmission requirements if the downlink compensation capability of the UE is not below the threshold, and
wherein the set of downlink transmission requirements comprises an error vector magnitude (EVM) requirement, or
an adjacent carrier leakage ratio (ACLR) requirement, or
a mask requirement comprising an absolute power emission requirement in one or more out-of-band (OOB) frequencies, or
any combination thereof.

25. The method of claim 24,
wherein the UE is an in-band UE in communication with the network component over an in-band frequency range, and
wherein the downlink compensation capability comprises a non-linear compensation capability of the in-band UE.

26. The method of claim 25, wherein the set of downlink transmission requirements comprises EVM requirement.

* * * * *